US008775369B2

(12) United States Patent
Largman et al.

(10) Patent No.: US 8,775,369 B2
(45) Date of Patent: Jul. 8, 2014

(54) COMPUTER SYSTEM ARCHITECTURE AND METHOD HAVING ISOLATED FILE SYSTEM MANAGEMENT FOR SECURE AND RELIABLE DATA PROCESSING

(75) Inventors: Kenneth Largman, San Francisco, CA (US); Anthony More, Sebastopol, CA (US); Kip Macy, Incline Village, NV (US); Shannon Bailey, San Rafael, CA (US)

(73) Assignee: VIR2US, Inc., Petaluma, CA (US)

( * ) Notice: Subject to any disclaimer, the term of this patent is extended or adjusted under 35 U.S.C. 154(b) by 1281 days.

(21) Appl. No.: 12/019,579

(22) Filed: Jan. 24, 2008

(65) Prior Publication Data
US 2008/0184218 A1 Jul. 31, 2008

Related U.S. Application Data

(60) Provisional application No. 60/897,401, filed on Jan. 24, 2007.

(51) Int. Cl.
G06F 17/30 (2006.01)
(52) U.S. Cl.
USPC .......................................... 707/609; 707/686
(58) Field of Classification Search
USPC .......... 717/169, 168, 122, 170, 175; 707/609, 707/686, 790–812; 307/43, 64
See application file for complete search history.

(56) References Cited

U.S. PATENT DOCUMENTS

| 4,464,747 | A | 8/1984 | Groudan et al. |
| 4,939,694 | A | 7/1990 | Eaton et al. |
| 5,434,562 | A | 7/1995 | Reardon |
| 5,655,069 | A | 8/1997 | Ogawara et al. |
| 5,704,031 | A | 12/1997 | Mikami et al. |
| 5,732,268 | A | 3/1998 | Bizzarri |
| 5,737,118 | A | 4/1998 | Sugaya et al. |
| 5,764,878 | A | 6/1998 | Kablanian et al. |
| 5,826,012 | A | 10/1998 | Lettvin |
| 5,841,712 | A | 11/1998 | Wendell et al. |
| 5,860,001 | A | 1/1999 | Cromer et al. |
| 5,894,551 | A | 4/1999 | Huggins et al. |
| 5,920,515 | A | 7/1999 | Shaik et al. |
| 5,974,549 | A | 10/1999 | Golan |
| 6,009,518 | A | 12/1999 | Shiakallis |
| 6,016,553 | A | 1/2000 | Schneider et al. |
| 6,067,618 | A | 5/2000 | Weber |

(Continued)

FOREIGN PATENT DOCUMENTS

| CA | 2197502 A1 | 8/1998 |
| EP | 0 978 785 A1 | 2/2000 |

(Continued)

OTHER PUBLICATIONS

International Search Report for International Application No. PCT/US08/051952 mailed Jul. 17, 2008.

(Continued)

Primary Examiner — Son T Hoang
(74) Attorney, Agent, or Firm — Cahn & Samuels, LLP

(57) ABSTRACT

System, method, computer, and computer program for secure data processing of potentially malicious code and documents or other data that may contain malicious code. System, method, computer for a secure and reliable computing environment to protect against data loss and/or corruption to provide secure and reliable data processing.

20 Claims, 12 Drawing Sheets

(56) References Cited

U.S. PATENT DOCUMENTS

| | | | |
|---|---|---|---|
| 6,088,794 | A | 7/2000 | Yoon et al. |
| 6,178,452 | B1 | 1/2001 | Miyamoto |
| 6,199,178 | B1 | 3/2001 | Schneider et al. |
| 6,205,527 | B1 | 3/2001 | Goshey et al. |
| 6,289,426 | B1 | 9/2001 | Maffezzoni et al. |
| 6,301,657 | B1 | 10/2001 | Jones et al. |
| 6,317,845 | B1 | 11/2001 | Meyer et al. |
| 6,327,653 | B1 | 12/2001 | Lee |
| 6,347,375 | B1 | 2/2002 | Reinert et al. |
| 6,359,986 | B1 * | 3/2002 | Tatebayashi ............... 380/277 |
| 6,367,042 | B1 | 4/2002 | Phan et al. |
| 6,374,366 | B1 | 4/2002 | Maffezzoni |
| 6,381,694 | B1 | 4/2002 | Yen |
| 6,421,792 | B1 | 7/2002 | Cromer et al. |
| 6,457,069 | B1 | 9/2002 | Stanley |
| 6,477,629 | B1 | 11/2002 | Goshey et al. |
| 6,577,920 | B1 | 6/2003 | Hypponen et al. |
| 6,594,781 | B1 * | 7/2003 | Komasaka et al. .......... 714/19 |
| 6,640,317 | B1 | 10/2003 | Snow |
| 6,697,950 | B1 | 2/2004 | Ko |
| 6,701,450 | B1 | 3/2004 | Gold et al. |
| 6,754,818 | B1 | 6/2004 | Lee et al. |
| 6,868,293 | B1 * | 3/2005 | Schurr et al. .................. 700/22 |
| 6,880,110 | B2 | 4/2005 | Largman et al. |
| 6,954,852 | B2 * | 10/2005 | Burokas et al. ................ 713/2 |
| 7,096,381 | B2 | 8/2006 | Largman et al. |
| 7,100,075 | B2 | 8/2006 | Largman et al. |
| 7,111,201 | B2 | 9/2006 | Largman et al. |
| 7,137,034 | B2 | 11/2006 | Largman et al. |
| 2002/0004908 | A1 | 1/2002 | Galea |
| 2002/0053044 | A1 | 5/2002 | Gold et al. |
| 2002/0059317 | A1 * | 5/2002 | Black et al. ................. 707/200 |
| 2002/0078366 | A1 | 6/2002 | Raice |
| 2002/0087823 | A1 | 7/2002 | Chow et al. |
| 2002/0087855 | A1 | 7/2002 | Dykes et al. |
| 2002/0095557 | A1 | 7/2002 | Constable et al. |
| 2002/0169998 | A1 | 11/2002 | Largman et al. |
| 2002/0174137 | A1 | 11/2002 | Wolff et al. |
| 2003/0105973 | A1 | 6/2003 | Liang et al. |
| 2003/0208338 | A1 | 11/2003 | Challener et al. |
| 2004/0083369 | A1 | 4/2004 | Erlingsson et al. |
| 2004/0158711 | A1 | 8/2004 | Zimmer |
| 2004/0210796 | A1 | 10/2004 | Largman et al. |
| 2004/0236874 | A1 | 11/2004 | Largman et al. |
| 2004/0255165 | A1 | 12/2004 | Szor |
| 2004/0268361 | A1 | 12/2004 | Schaefer |
| 2005/0010670 | A1 | 1/2005 | Greschler et al. |
| 2005/0060722 | A1 | 3/2005 | Rochette et al. |
| 2005/0149726 | A1 | 7/2005 | Joshi et al. |
| 2005/0223224 | A1 * | 10/2005 | Carpentier et al. .......... 713/165 |
| 2006/0020848 | A1 * | 1/2006 | Maity et al. .................. 714/6 |
| 2006/0020858 | A1 | 1/2006 | Schaefer |
| 2006/0020937 | A1 | 1/2006 | Schaefer |
| 2006/0143514 | A1 | 6/2006 | Largman et al. |
| 2006/0184736 | A1 | 8/2006 | Benhase et al. |

FOREIGN PATENT DOCUMENTS

| | | |
|---|---|---|
| EP | 0978785 A1 | 2/2000 |
| WO | WO 95/22794 A1 | 8/1995 |
| WO | WO9522794 A1 | 8/1995 |
| WO | WO 01/11449 A1 | 2/2001 |
| WO | WO0111449 A1 | 2/2001 |
| WO | WO 02/21274 A1 | 3/2002 |
| WO | WO 02/099642 | 12/2002 |
| WO | WO 03/073208 A2 | 9/2003 |
| WO | WO 03/075158 A2 | 9/2003 |
| WO | WO 03/075158 A3 | 9/2003 |
| WO | WO 03/096169 A2 | 11/2003 |
| WO | WO 03/104954 A2 | 12/2003 |
| WO | WO 2004/012416 A2 | 2/2004 |
| WO | WO 2005/043360 A1 | 5/2005 |

OTHER PUBLICATIONS

Unknown Author, "Bulletin Board," Laptop Magazine, p. 14, Jul. 2001.
Collection of printouts from GreenBorder website, © 2004-2006 GreenBorder Technologies, Inc., www.greenborder.com, Jan. 27, 2006, 36 pgs.
Whitepaper: iSolation Server v.2, 2005, Avinti, Inc., Lindon, UT, 15 pgs.
"iSolation Server FAQ," © 2003-2006 Avinti, Inc., www.avinti.com/downloads/isolation-server-faq.html, Jan. 27, 2006, 4 pgs.
Avinti, iSolation Server v.2 Whitepaper, © 2003-2006 Avinti, Inc., www.avinti.com/downloads/isolation-server-whitepaper.html, Jan. 27, 2005, 15 pgs.
Elrad, Tzilla et al., "Developing Secure Applications Through Aspect-Oriented Programming," Nov. 18, 2004, 27.1 Introduction, 27.2 The Domain of Application-Level Security, 27.3 An Experience Report, 27.4 Discussion, 27.5 Related Work, 27.6 Conclusion, Acknowledgements, References, © 2003-2006 Pearson Education, Addison-Wesley Professional, Sample Chapter begins at www.awprofessional.com/articles/article.asp?p=340869&seqNum=1, 29 pgs.
"Server and Domain Isolation Using Ipsec and Group Policy," Mar. 17, 2005, © 2006 Microsoft Corporation, www.Microsoft.com/technet/security/topics/architectureanddesign/ipsec/default.mspx, 4 pgs.
Grizzard, Julian B. et al. "Towards an Approach for Automatically Repairing Compromised Network Systems," Jun. 2004 or later, 4 pgs.
Zeichick, Alan, Isolation and Protection: Intel's LaGrande Vision for Trusted Virtualization, Nov. 22, 2005, www.devx.com/Intel/Article/30008, Jan. 27, 2006, 4 pgs.
Sapuntzakis, Constantine and Monica S. Lam, "Virtual Appliances in the Collective: A Road to Hassle-Free Computing," May 2003 or later, 6 pgs.
Chandra, Ramesh et al., "The Collective: A Cache-Based System Management Architecture," Presented at the 2nd Symposium on Networked Systems Design and Implementation, May 2-4, 2005, Boston MA, 14 pgs.
Chow, Jim et al., "Understanding Data Lifetime via Whole System Simulation," Aug. 2003 or later, 16 pgs.
Ruwase, Olatunji and Monica S. Lam, "A Practical Dynamic Buffer Overflow Detector," Jun. 2003 or later, 11 pgs.
Garfinkel, Tal et al., "Ostia: A Delegating Architecture for Secure System Call Interposition," Aug. 2003 or later, 15 pgs.
Sapuntzakis, Constantine et al., "Virtual Appliances for Deploying and Maintaining Software," Jun. 2003 or later, 15 pgs.
Brumley, David and Dan Boneh, "Remote Timing Attacks are Practical," 2003 or later, 13 pgs.
Li Ninghui et al. "Obvious Signature-Based Envelope," PODC'03, Jul. 13-16, 2003, Boston, MA, p. 182-19, © 2003 ACM, 8 pgs.
Garfinkel, Tal et al., "Flexible OS Support and Applications for Trusted Computing," Feb. 2003 or later, 6 pgs.
Garfinkel, Tal and Mendel Rosenblum, "A Virtual Machine Introspection Based Architecture for Intrusion Detection," Dec. 2002 or later, 16 pgs.
Garfinkel, Tal, "Traps and Pitfalls: Practical Problems in System Call Interposition Based Security Tools," Nov. 2002 or later, 14 pgs.
Sapuntzakis, Constantine et al., "Optimizing the Migration of Virtual Computers," Dec. 2002 or newer, 14 pgs.
Garfinkel, Tal et al., "Terra: A Virtual Machine-Based Platform for Trusted Computing," SOSP'03, Oct. 19-22, 2003, Bolton Landing, NY, © 2003 ACM, 14 pgs.
Lam, Monica et al., "The Collective: A Virtual Appliance Computing Infrastructure," http://suif.Stanford.edu/collective/index.html, Jan. 27, 2006, 3 pgs.
Messmer, Ellen, "GreenBorder offers security 'barrier' for IE, Outlook," Mar. 23, 2005, Computerworld, © 2005 Network World, Inc., www.computerworld.com/securitytopics/security/story/0,10801,100579,00.html, Jan. 27, 2006, 4 pgs.
Schmidt, Brian K. et al., "The Interactive Performance of SLIM: a Stateless, Thin-Client Architecture," 17th ACM Symposium on Operating Systems Principles (SOSP'99), Published as Operating Systems Review, 34(5):32.47, Dec. 1999, SOSP-17, Dec. 1999, Kiawah Island, SC, © 1999 ACM, 16 pgs.

(56) References Cited

OTHER PUBLICATIONS

Schmidt, Brian K. et al., "Supporting Ubiquitous Computing with Stateless Consoles and Computation Caches," Aug. 2000, 140 pgs. Microsoft Corporation Microsoft Windows 95 Resource Kit, 1995, Microsoft Press, pp. 650-651.

The International Search report for PCT application PCT/US06/013343 Search Report dated Nov. 7, 2007.
English abstract of WO952279494 (A1).
English abstract WO0111449 (A1).
English abstract EP0978785 (A1).

\* cited by examiner

COMPUTER SYSTEM ARCHITECTURE AND METHOD HAVING ISOLATED FILE SYSTEM MANAGEMENT FOR SECURE AND RELIABLE DATA PROCESSING

BENEFIT AND RELATED APPLICATIONS

This patent application claims the benefit of priority under 35 U.S.C. 119(e) to: U.S. Provisional Patent Application Ser. No. 60/897,401 filed 24 Jan. 2007 entitled Computer System Architecture and Method Having Isolated File System Management for Secure and Reliable Data Processing, naming Kenneth Largman, Anthony More, Kip Macy, and Shannon Bailey as inventors, common assigned to Vir2us, Inc., Sausalito, Calif., and incorporated herein by reference.

FIELD OF THE INVENTION

This invention pertains generally to computer systems, computer architectures, and methods for operating computers or other information appliances that have isolated file system management features to provide for secure and reliable data and information processing.

BACKGROUND OF THE INVENTION

Currently, most if not all security controls in computers and computer systems and information appliances rely on the secure environment of their computing architecture and operating system. Application programs, program suites, and system and application updates with varying or conflicting security requirements may have to be installed and run on separate hardware or rely on their operating systems to isolate the application program sets and impose and enforce different security and/or access requirements within the application sets.

While discretionary access controls common in products exist, these produces may typically not be capable of solving the generic problem of malicious code (viruses, spy-ware, hacker code, pop-ups, Trojan horses, or the like) and cannot sufficiently identify nor separate what a user intends to run or execute, from what a user is or may be unintentionally executing (such as viral code attached to a user file). Also, discretionary controls may presume that users are acting in an authorized way, and this may not always be the case. Vulnerable system files, applications, and unsophisticated users may allow malicious code to enter and compromise a system. In short, the operating systems of conventional processing environments are intrinsically compromisable.

These problems cannot be readily solved by adding a higher-level security infrastructure in conventional ways. Considering the most important predicted threats against system security are, for example, malicious developers, trap doors left during development and/or distribution, boot-sector viruses, root-kits, and compiler trap doors, effective security cannot be implemented in the operating system layers above it, for example in applications or middleware, because related security controls can be bypassed by those threats. Various integrity checkers, anti-virus scanners, and similar security applications are useful for mitigating risk, but have not and cannot provide security guarantees as they themselves may be compromised by the malicious code they are intended to detect. In addition, for certain anti-virus and anti-spyware, they require prior knowledge of the code or code segments or code signatures they are intended to detect.

Particularly problematic is the administration of file input and output (I/O) requests in a conventional computer, execution of unintended requests, undesired requests from automated processes, or even requests by unauthorized third parties over a network results in the unsafe exposure of all files and file directories in the computer. Viruses, worms, Trojan horses, and other malicious code and malware can attack user and system files resulting in corruption to existing files, suboptimal processing speeds, inoperable or unstable computing environments, or access to confidential data by unauthorized third parties. For computers connected onto a network, installation of downloaded and unverified or unverifiable data may also result in the execution of malware attached to such files. User error is further known to cause problems to the normal operation of a computer with unintended or unknown modifications to critical system, program and/or user files. Ultimately, the effects of these problems may leave all or part of data corrupt and/or irretrievably lost.

Malicious threat to critical boot-sector files in the current computing architecture may also occur through such direct disk (or other storage device boot sector, region, or equivalent storage) access. When booting a conventional computer, the processor typically first reads the master boot record and then loads the boot loader and other necessary information from the hard disk using block-direct disk reads. When updates to the master boot record are attempted, the conventional architecture allows direct access to the hard disk for any reads and writes. Although operating system level controls may thwart some access to files, the operating system level is not adequately capable of protecting against other malicious code residing below it. Such malicious code may freely modify boot sector files and load up during the boot process and modify the file system without additional controls from below the operating system level.

Of primary importance in the management of all data access and file updates is the file system within the computer. A file system provides the file directory structure for data storage and allows users and application programs to access files in storage. A computer typically has a single file system which manages all file access and updates for the computer for which it operates. Conventional file systems are operative to monitor inbound and outbound file update traffic. A file system filter driver may intercept requests intended for the file system, another file system filter driver, a network, or a block device. By intercepting the request before it reaches its intended target, the filter driver can extend or replace functionality provided by the file system. Examples of file system filter drivers include anti-virus filters, backup agents, and encryption products which can offer additional protective measures against malware for file I/O requests prior to reaching the file system.

While prior art file systems have beneficial aspects in combating the effects of malware through extended functionality provided by the filter driver, such file systems also have disadvantageous aspects. One disadvantageous aspect is that a computer cannot safely access a single file or group of files within the file system without providing access to other files and thus exposing such other files. Once access is gained to the file system, all files are exposed and may be modified despite the protective measures of anti-virus software operative via the filter driver. For example, if a zero day virus has attached to a seemingly legitimate update file, then installation of the update file will result in the execution of the malicious code and further access by the malicious code to the remaining files via the file system. Installation of a program application update may also involve the update of a driver file that is commonly used for other applications utilizing a previous driver version. Although the update may in fact be legitimate, updating the driver may cause incompatibility issues with the remaining programs that also utilize the driver.

Another disadvantageous aspect of the conventional single file system environment is the ability of malicious code and other malware to circumvent the file system and read or write data directly to the block device. This circumvention technique facilitates unauthorized access by malicious code and other malware to a processing environment's metadata and furthermore facilities the malicious code's ability to modify metadata or other critical system content through such unauthorized means and channels.

Other solutions utilize the partitioning of processing environments to isolate select processing activities, such as for example the use of virtual computing environments to isolate the installation of a new application program. These solutions nonetheless leave the computing system susceptible to malicious code or other potential file incompatibilities. In order for a new application program to obtain full access to existing user files and other application program files, the new application program must still be managed by the computer's primary file system thus exposing data to potential malicious code or other harmful effects associated with the installation of a new application program file or file set.

Another disadvantageous aspect of the prior art file system relates to the manner in which files are restored. Conventional systems allow users to backup files using a snapshot method where the system takes a snapshot of all files and file directories in the present system. In the event the user desires to revert to a prior file system state, then all directories and files in the file system are reverted to the prior version as provided for in a snapshot. Under the conventional snapshot method, all or none of the files must be reverted to the prior version. Although users may manually create backups for particular files, such backups are typically cumbersome and require the user to manually manage system resources and manually delete and create such backup files.

Notwithstanding such current limited and oftentimes ineffective defenses against malicious code, conventional systems further fail to ensure system integrity and provide dependable protections against data loss resulting from system infrastructure problems which may include power supply interruptions, complete power failures, system crashes, and/or other internal or external component failures. While the use of secondary power sources may resolve the issue of power supply failures, such solutions fail to protect against data loss that occurs when a hard drive fails or a system crashes from non power supply related causes, such as for example memory corruption, non-responsive services, or other hardware- and/or software-related flaws in computing systems, other information appliances, or other electronic devices that utilize a processor and execute software or firmware that might be susceptible to compromise.

What is needed is an architecture, system architecture, method and operational methodology that provides enhanced protection from computer hacking, viruses, spy-ware, cyber-terror attacks, and the like malicious activity and/or code. There also remains a need for an architecture, system architecture, method and operational methodology that protects against data loss to provide secure and reliable data processing.

SUMMARY

Figure 1:
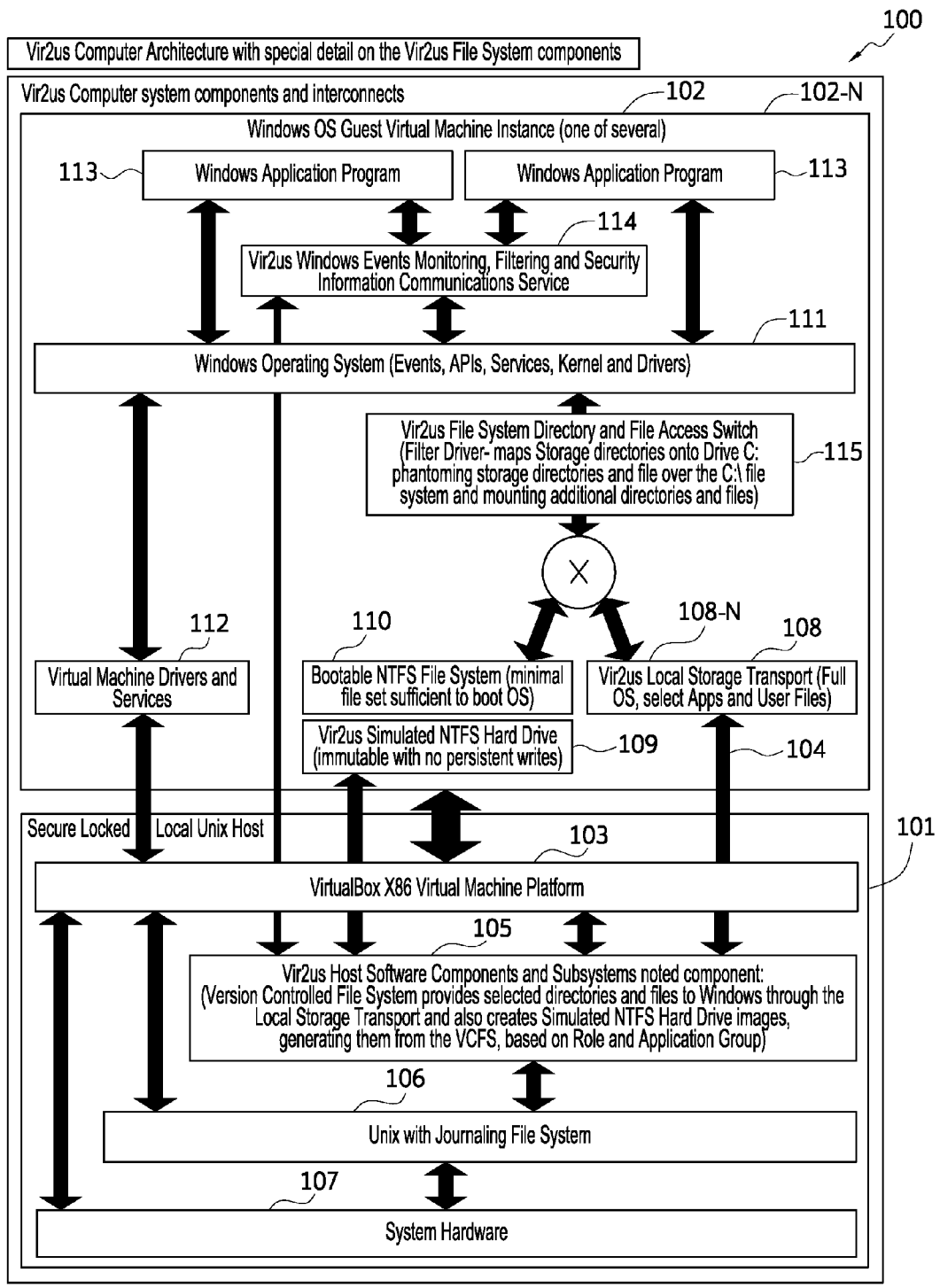
FIG. 1 is a diagram of processing system hierarchy and the location of a file system and file system filter driver therein in accordance with one embodiment of the present invention.

In one aspect the invention provides a method for a computer or information appliance to securely manage file updates.

In one aspect the invention provides a method for a computer or information appliance to securely process installations.

In another aspect the invention provides an information appliance or secure user computing environment architecture.

In another aspect the invention provides a method for a computer or information appliance to provide isolated data encryption of a plurality of data stores.

In still another aspect, the invention provides a method for a computer or information appliance to receive inputs and transmit outputs in isolation.

In yet another aspect the invention provides a method for a computer or information appliance to prevent against data loss resulting from an interruption in the power supply to the main processing environment.

DETAILED DESCRIPTION OF EMBODIMENTS OF THE INVENTION

The above problems and limitations of the conventional system and methods are solved by the inventive approach in which a first processing environment, also referred to herein as the host processing environment, control computing environment (CCE), or the Vir2us™ control computing environment, governs the file system and content access controls of a second processing environment, referred to herein as the guest processing environment or the user computing environment (UCE), thus providing the isolation required to lay the foundations of a security processing system (one embodiment of which is referred to as the Vir2us™ security processing system). References to the vir2us™ security processing system or vir2us™ embodiments are intended to refer to inventive aspects of the inventive security processing system, to the inventive control computing environment, and/or to other inventive aspects as described herein and are not limited to any particular embodiments, or in the related patent applications incorporated by reference herein and assigned to Vir2us, Inc.

The CCE may utilize its own processing logic and memory stores to support file and directory management activities such as file read, write, deletions, and creations, as well as data security features exclusively within the control computing environment including, for example, data encryption. Although a UCE incorporating the security processing system believes that it is still managing such activities using its own resources, the CCE is actually managing all reads and writes to data storage (or other data storage device or means) according to the infrastructure of the CCE.

More particularly, a secure first file system in the CCE securely provides file and file directory access and updates in response to file I/O requests by a UCE. A selected file or file set is exclusively executed in the UCE, where file I/O requests are initiated. After boot up of a UCE, subsequent file I/O requests by the UCE are passed from a second file system in the UCE through a file system filter driver also residing in the UCE before reaching the secure first file system in the CCE. A version manager in the CCE is also operative to monitor and manage the file and file directories that are retrieved from the secure file system and provided to the UCE.

An additional advantageous feature of the invention is that communication between the CCE and UCE may be limited to facilitate secure data communication between the environments. In one embodiment, with local disk booting by a UCE, upon booting its OS and loading and initializing the OS drivers, the CCE may limit additional file system requests intended for the hard drive through the block device interface. Although, bootable files may stay open, no new file requests will be permitted through the block device interface. Any future file requests intended for the hard drive may only be communicated through a file system interface and thereby governed by the CCE. Where files and/or file systems are not specifically used, equivalent identified data portions or content rather than files, and data structures or organizations other than file systems may be adapted to or utilized.

Further security is provided by the invention against data corruption and unreliability according to the infrastructure of the system. In one non-limiting embodiment, the CCE may provide enhanced reliability against data loss by preserving pending write operations or writes intended for a data storage when a power supply irregularity or failure occurs using inventive power source systems.

A description of a non-limiting embodiment of the invention in use follows. A user powers-up a computer incorporating an embodiment of the invention. During the computer's boot cycle, the user selects a profile (also referred to herein as a role) which retrieve a copy of the operating system (OS), application (App) and/or user files associated with that profile. At some later point, the user connects to the Internet and downloads a file that is without knowledge by the user infected with malicious code. The executed malicious code then proceeds to run a virus installer which finds an OS driver file to infect and extends the existing driver file to include extra code. Changes to the files and/or directories in the file system that do not occur in accordance with the invention's secure update methods will be reverted upon reboot. Upon reboot, the user again requests to retrieve the selected profile which loads the appropriate OS, application, and/or data, without loading the recent modifications to the OS driver file.

It may be appreciated in light of the description provided here that any one or combination of various storage devices or means known in the art or to be developed may be utilized for storage in computers, computing systems, and/or other information appliances. Such storage devices may, for example, include by way of example but not limitation, rotating media storage devices such as hard magnetic storage disk drives, optical disk drives, floppy or flexible media drives, solid state memory storage devices, Flash memory drives, or any other computer readable storage media. Such storage means may, for example, include by way of example but not limitation, virtual hard disk drives or simulated disk drives. For ease of description, references to hard disk drives, hard drives, or other media types are intended to include any one or combination of storage devices or means.

It may also be appreciated in light of the description provided here that although computers such as desktop computers, personal computers, notebook computers, and the like machines have traditionally been susceptible to the data integrity risks mentioned above, this invention is not so limited to such computers but also includes without limitation other computing devices, information appliances, personal data assistances (PDAs), smart phones, cellular and mobile phones, home appliances, communication devices, and/or other devices or systems that include computer like elements as described herein, such as a processor or processing logic, memory or other storage, and the like. The inventive methods and architectures may be utilized with any of these devices or systems to provide the security and other features described herein. Therefore references to computers and/or computer systems may be interpreted to include these other devices and appliances as well as conventional computers.

Exemplary Embodiment of Inventive File I/O Request Processing System

Referring to FIG. 1, a diagram of components and subsystems of the CCE 101 and a UCE 102 in accordance with the present invention is shown. Although the embodiment in FIG. 1 describes the invention having a single UCE 102, it may be appreciated that the invention may comprise a plurality of UCEs 102-1, ... 102-N communicatively coupled to the CCE 101. Furthermore, UCEs 102-1, ... 102-N may be physical or virtual environments. In one non-limiting embodiment, each UCE 102-1, ... 102-N may contain the same OS or a different OS as the CCE or as another UCE.

Referring to the preferred embodiment, the inventive system is comprised of a CCE 101 and a USE 102. In one embodiment, the CCE 101 may be a local Linux OS and the UCE may 102 be a Microsoft Windows-based OS. The CCE 101 and UCE 102 may be referred to in FIG. 1 through FIG. 4 and further herein as the host and guest environments, respectively. In the inventive system, the OS 105 of the host environment 101 acts as a secure, locked subsystem whereby direct file I/O requests are exclusively limited to the selection of, for example, user roles. In one non-limiting embodiment, residing in the host environment 101 is a virtual machine platform 103, a local storage transport service 104, a file system 105, a journaling file system 106, and the underlying hardware components 107 of the invention. In one non-limiting embodiment, VirtualBox™ x86 (VirtualBox™ is a product of innotek, GmbH, in Germany) is the virtual machine platform 103 residing in the host environment 101.

The virtual machine platform 103 utilizes the resources of the system hardware 107 and is communicatively coupled to the host file system 105 and the host journaling file system 106. Using the host file system 105, the host environment 101 supplies a hard drive to the virtual machine platform 103 for creation of the guest environment 102. For example, the supplied hard drive may be physical data storage such as ROM, RAM, flash storage, DVD, or other storage device or means known in the art. In another embodiment, the hard drive may be a logical data storage that is simulated, emulated, or replicated from data in the host file system 105, or in another example, the logical data storage may be a virtual hard drive created by the host environment 101. In yet another embodiment, the supplied hard drive may be a combination of physical and logical data storage.

In one non-limiting embodiment, a hard drive image is generated by the file system 105 based on a user or application role as further discussed herein. A role is a set of files and/or directories that are associated based on one or more criteria. For example, a user role may contain the OS, App, and/or user files that are most commonly used by a particular user. The host file system 105 also communicatively couples to the host journaling file system 106 to enable the guest environment 102 to access selected files and file directories of the host file system 105 via the local storage transport service 104.

It may be appreciated that the local storage transport 104 may be operative in a physical, logical or a combination of physical and logical representations. In one non-limiting embodiment, the local storage transport 104 may be a server-client protocol for establishing communication between the host and guest environments 101, 102. For example, the local storage transport 104 may be a Common Internet File System (CIFS) or Samba network protocol suite. A local storage 108 for storing data transported through the local storage transport may contain any one or combination of the following: a full guest OS, application files, or user data files. In one non-limiting embodiment, the local storage 108 may be selected from the set of storage consisting of a RAM, ROM, flash memory, compact flash card memory, CD, DVD, and combinations thereof. In other non-limiting embodiments, the local storage 108 may be a combination of physical and logical data storage.

Referring now to the guest environment 102, and in one non-limiting embodiment, the guest environment 102 is represented by a virtual machine that is managed, created, and controlled by the host's virtual machine platform 103. In another embodiment, the guest environment 102 may be a separate physical computing environment which is communicatively coupled to the host environment 101 via a physical connection such as an Ethernet cable or other network connection communication link.

Comprising a key element of the guest environment 102 is a simulated hard drive 109. The simulated hard drive 109 may be nonvolatile memory so that data stored on the simulated hard drive 109 cannot be modified after it is created by the host OS 105. The simulated hard drive 109 may also include a bootable file system which comprises a minimal file set sufficient to boot up the guest environment 102. For example, the bootable file system may be the New Technology File System (NTFS) which is the standard file system of the Microsoft® Windows NT operating system.

Also operative in the guest environment 102 is an OS 111 which may be a Microsoft® Windows-based OS, in one non-limiting embodiment. The guest OS 111 supports and/or provides the events, APIs, services, kernel and drivers for the guest environment 102, including the management and execution of guest OS application programs 113. In other non-limiting embodiments of the inventive system where multiple guest environments 102-1, ... 102-N exist, such guest environments 102-1, ... 102-N may have the same or different OS as the host environment 101. For example, the guest environment 102 or the plurality of guest environments 102-1, ... 102-N may be operative with DOS, Windows, Linux or other OS.

Communicatively coupled to the guest OS 111 is the virtual machine drivers and services of the host's virtual machine platform 112. In the preferred embodiment, the guest OS 111 is also communicatively coupled to a communication service protocol 114 which monitors events, filters, selects, and/or moves data between the application programs 113 and the guest OS 111, and administers file I/O requests by guest application programs 113 intended for the guest's file system 110. The host environment 102 is further communicatively coupled to the communication service protocol 114 of the guest environment 102 so that all events, filtering, selection, data transmission, and security information of the guest OS 111 and applications 113 are also monitored by the host environment 101.

A filter driver 115 in the guest environment 102 is communicatively coupled to the simulated hard drive 109, the local storage transport service 104, and the guest's file system 110. In the inventive system 100, the filter driver 115 may be a logical or physical switch, or a combination of a logical and physical switch representation. Extended functionality is provided by the filter driver 115 to both the guest and host file systems 110, 105 by allowing the host's file system 105 to enumerate and provide files and file directories to the guest file system 110, and further passing file I/O request from the guest environment 102 intended for the guest file system 110 to the host file system 101.

It may be further appreciated that multiple guest environments 102-1, ... 102-N may be communicatively coupled to the host environment 101 to provide secure data processing. In one non-limiting embodiment, the host environment 101 is the server and the guest environments 102-1, ... 102-N may be clients in a traditional client-server configuration known in the art. Each guest environment 102-1, ... 102-N may communicatively couple to the host environment 101 via a local storage transport 108-1 ... 108-N between each guest environment 102-1, ... 102-N and the host environment 101.

Exemplary Embodiment of the System Filtering Process

Figure 2:
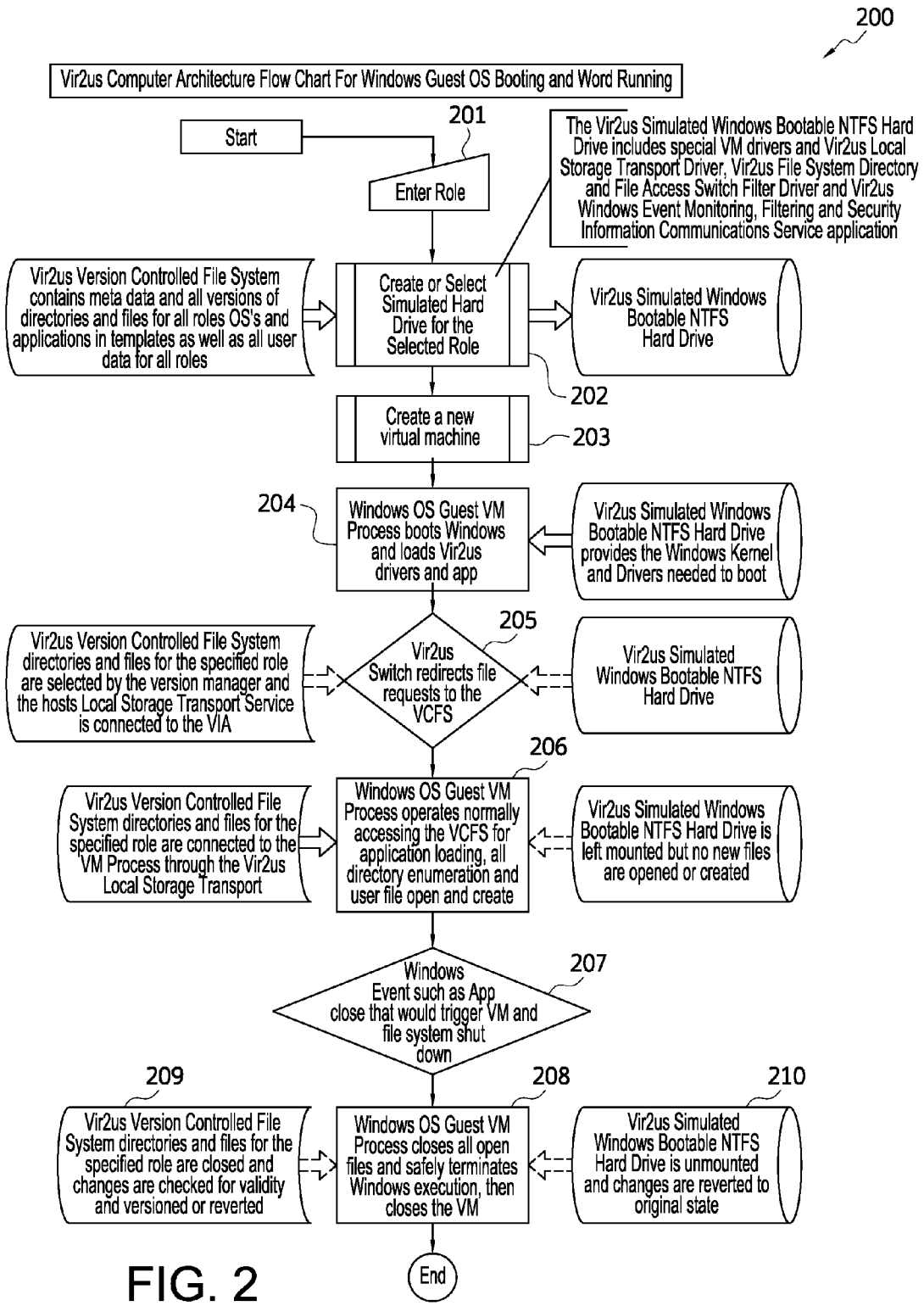
FIG. 2 is a flow diagram of the secure file system functions within the system of FIG. 1 in accordance with one embodiment of the present invention.

Referring to FIG. 2, a flow diagram of the processing of file I/O requests from the guest environment 102 to the secure host file system 105 in accordance with the present invention is shown.

As illustrated therein, the host environment first boots up and loads its OS, including the secure file system of the host environment. In one non-limiting embodiment, following boot up of the host environment, the system may prompt a user for selection or identification of a role, step 201. A role is the set of files comprised of operating system, application program, and/or user data files that are associated based on certain criteria. For example, a user role may contain the files that are most commonly used by a particular user, such that upon system log-in by a user, files associated with selected user role are accessed and retrieved and files not associated with a particular user role are not accessed. In one embodiment, a user may input a unique user ID or other identifying information to prompt retrieval of a particular user role. Other embodiments of the inventive system may utilize roles which are the one or more file or file sets that are associated by one or more other criteria. For example, a role may be the set of files comprising the operating system, application program, and/or user data files that are created on a certain date. Another exemplary role may be a master template comprising the pristine files and/or directories of an operating system or application program.

Upon request to access and retrieve a user role, in one non-limiting embodiment the host environment creates a simulated hard drive for the requested role, step 202. Creation of the simulated hard drive (step 202) is carried out from within the host OS, and includes the retrieval of special VM drivers, a local storage transport driver, a filter driver, the guest's event monitoring, filtering and security information communications service application, and a bootable hard drive (including a bootable guest file system) to be used in creating the guest environment. The guest file system also contains meta data and all versions of files and file directories for all OS and applications in all the roles, as well as the user data for all such roles. Files or file sets comprising the roles are represented in templates, which are pristine copies of full or partial OS, application, and data files. Following creation of the simulated hard drive, a guest environment is then created by the virtual machine platform using the simulated hard drive.

In another non-limiting embodiment, the host environment selects a simulated hard drive for the requested user role, step 202. Following boot-up of the host environment, the host environment creates a simulated hard drive for each user profile, step 202. Upon request to access and retrieve a user role, the host environment selects from among a selection of already created simulated hard drives from which the guest environment becomes operative. This embodiment may find applicability in embodiments where further time efficiencies in loading a user role are desired.

Following the creation or selection of a simulated hard drive for the selected role (step 202), the virtual machine platform in the host environment initializes a guest environment by creating a virtual machine (step 203) utilizing the bootable file system in the simulated hard drive. During booting of the guest environment (step 204), the relevant guest file system directories and the files for the specific role are selected by a version manager. The version manager may be an instruction set, program application, or other software logic residing in the host environment which manages the multiple file and file directory versions of the secure file system and retrieves the appropriate versions based on the user role. The host's local storage transport service is also communicatively coupled to the virtual machine containing the guest environment during booting of the guest environment. After boot-up of the guest environment (step 204), the guest environment may load the selected OS, driver and application files, which are provided by the secure file system in the host environment via the local storage transport service.

When loading of the guest OS is complete, all interface between the user and the system is restricted to the guest environment. Files from the host's secure file system that are accessed by the guest environment during boot-up of the guest environment remain mounted (open) while the guest environment remains operative. However, new file I/O requests by the guest environment, such as for example file open and create events, are directed to the guest file system, where the filter driver further directs all such requests to the host's secure file system, step 205. All file requests passing through the filter driver from the guest environment to the host file system are routed through the local storage transport service. The version manager then retrieves the files and file directories for the specific role from the secure file system and provides such selections to the guest environment through the local storage transport service. In one embodiment, the version manager also administers system policies for saving updates, discarding updates, or retrieving particular file and file directory versions from the host's secure file system.

It may be appreciated that all file I/O requests in the inventive system are managed by the secure file system, although updates and file I/O request from the user are received via the guest file system. The host file system manages, administers and enables all requests for application loading, directory enumeration and user file open and create events in the guest environment, step 206. The process by which the version manager selects the files and file directories from the host file system and provides such data to the guest file system via the local storage transport service may be referred to herein as the phantoming or overlaying of the guest file system above the host file system, thus resulting in the secure processing of file I/O requests by the host file system.

The above process of securely accessing the host file system is also applied to the launching of new application programs when a user role is already operative in the guest environment. The inventive system utilizes one or more application roles whereby select application program files (e.g. driver, executables, etc.) and program data files are associated with a particular application role. In one non-limiting embodiment, when an application program is not already associated with a user role, the host environment first creates or selects a simulated hard drive for the selected application role when a user launches an application from the desktop of the user role environment. The simulated hard drive includes a bootable hard drive, a file directory, a filter driver, and local storage transport service from which a newly created virtual machine, and thus a new guest environment exclusively for the application role, becomes operative. The version manager also selects the necessary file versions from the host file system, which include the selected OS, application, and data files for the new guest file directory. The application guest environment is then isolated from the other file I/O events in the user guest environment where the user role is operative. Files that are already mounted in the boot-up of the application guest environment remain open while new create and update events directed to the file system of the application guest environment are routed through the filter driver of the application guest environment through the local storage transport service to the host file system.

When a user requests to shut down or log off a user and/or application role, the observance of the request by the monitoring and filtering service of the guest environment prompts the host file system to first close the opened files and file directories for the specific role. The virtual machine platform may then discard or delete the virtual machine upon the closing of such opened files and file directories, step 208. To process updates to files and file directories, the system update process as further described herein may then check all updates for validity, step 209. During the system update process, updates are either written to the secure file system or discarded. Following file updates, if any, the simulated hard drive is un-mounted (closed) and changes to files on the simulated hard drive are discarded thus reverting the simulated hard drive files their unmodified version, step 210. For example, a user database file may be updated prior to closing an application guest environment accessing the user database. In one non-limiting embodiment, rolling snapshots are taken of the directories and files during the update process, so prior to closing a file or file directory, data may be reverted to a previous version and thus updates do not persist to the next retrieval of such data.

Exemplary Embodiment of the System Update Process

Operation of the system described in FIG. 1 is now described with regard to the inventive system's update process whereby update requests passing through the filter driver from the guest environment to the host file system are selectively monitored, stored or discarded. File updates are referred to herein as new file versions, and new file versions may be captured and retained by the host environment in a time-based or event-based manner. In one non-limiting embodiment, new file versions may be automatically captured every 5 minutes or captured upon a user-initiated save file request. For example, file versions may be retained prior to each file update request and stored in a database in non-volatile memory in the host environment. In another non-limiting embodiment, only the incremental change between the new version and its currently stored version are stored in a database. The version manager in the host environment may then discard file versions based on various policies such as, for example, maximum number of versions to retain, data storage limitations, processing efficiencies or other pre-determined criteria. In the event that data has been unintentionally or accidentally updated or deleted, the inventive system may revert only the selected files to their previous versions without reverting all files and file directories in the host file system to their previous versions.

In one embodiment, for application program or OS updates received by a guest environment via an external source such as a third party server, such updates may be further monitored and evaluated by the host system prior to the installation of such updates. In conventional computing systems, application program updates are pushed out from a central third party server, and upon connecting to a server network computing systems retrieve the updates and then manually or automatically installs the updates. With conventional single file system configurations, installation of updates expose all data in the sole file directory to potential system or program instabilities (e.g. when driver incompatibilities exists) or otherwise to the harmful effects of undetected malicious code attached to the updates.

In the inventive system, application program and OS updates may be installed in a secure manner via an update verification process for situations where malicious code or other malware attaches to legitimate updates and executed or installed alongside legitimate updates. Upon receipt of an update by the guest environment and prior to installation of such update, the host environment captures the differences between the update and the current file or file sets in a database in nonvolatile memory residing in the host environment. The system then verifies whether such update has been received by the system before. In one non-limiting embodiment, the verification process involves comparing the current update to previous updates, if any. For example, the verification process may check for the identical update, check-sum, encoding, or clustering of files compared to prior attempted updates. The first time an update is attempted the update is simply stored in the update database but installed. For subsequent attempts by a third party to provide the same update, the system will verify whether the update has been received before by accessing and comparing such update to the updates stored in the update database. In one non-limiting embodiment, the inventive system has a pre-determined policy for how many times the attempted update and verification process will be performed prior to installation. For example, the inventive system may incorporate a policy to avoid taxing system memory or to minimize the burden on third party servers of providing such updates. When updates have been verified as identical after several update attempts, the system then installs the updates in the host file system.

Exemplary Embodiment of the Automated System Update Process

Figure 3:
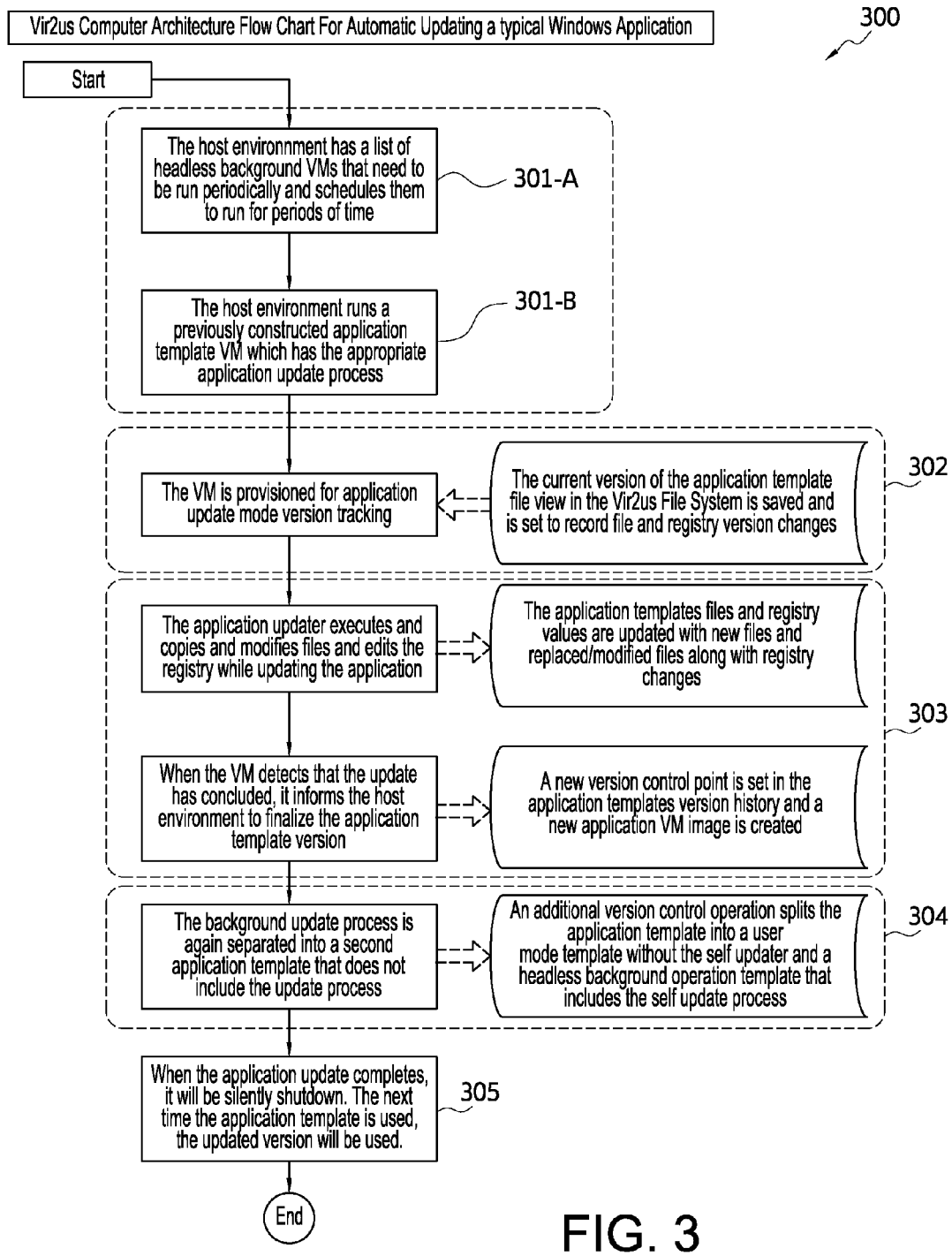
FIG. 3 is a flow diagram of the automatic updating process in accordance with one embodiment of the present invention.
Figure 4:
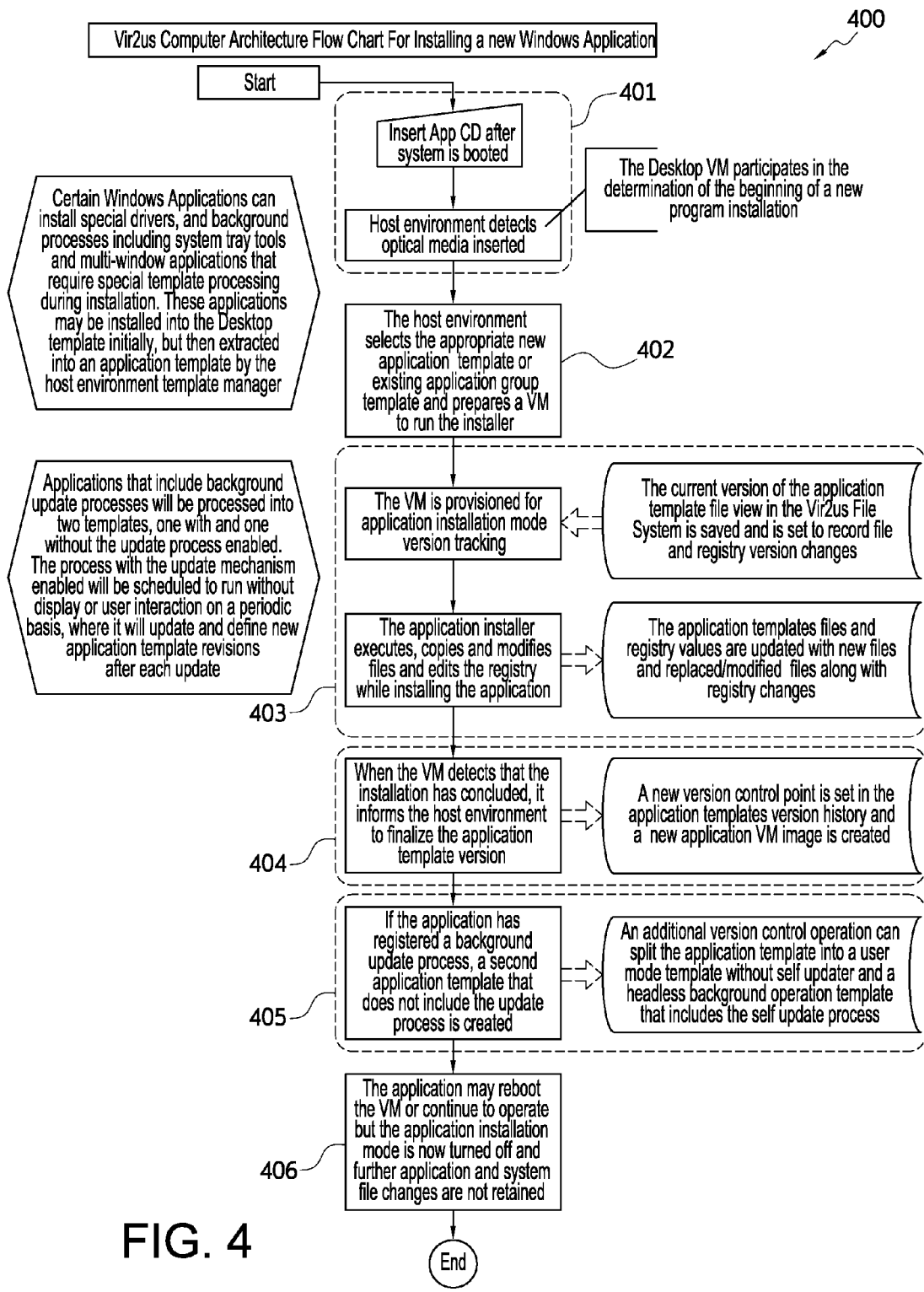
FIG. 4 is a flow diagram of the new program application installation process in accordance with one embodiment of the present invention.

FIG. 3 is a flow diagram of the automatic updating process in accordance with one embodiment of the present invention. According to FIG. 3, the invention may provide secure and isolated file updates or new application installations without performing a verification process. In one embodiment, the virtual machine platform in the host environment provides a new isolated second guest environment for processing a file update, step 301. The host environment may either create a bootable hard disk image for the second guest environment using a copy of the files and directories, referred to herein as a template, as the first guest environment, or retrieve an already-booted guest environment operative with a data template of the first guest environment, step 301-A. In one embodiment, when updating an application, the host environment provides an application template containing a copy of the non-updated application files and an application update process to the second guest environment, step 301-B.

It may be appreciated that the second guest environment is not enabled for user interaction, referred to herein as a "headless" environment, and all update processing is performed in the second guest environment and on the host file system via the filter driver in the second guest environment. User activities in the first guest environment are then isolated from security risks by external file update sources since the file update is merely retrieved by the guest environment and thereafter managed by the host environment and processed in the second (headless) guest environment. In one embodiment, the invention may track or manage such updates by recording file and registry version changes in the host file system, step 302. Upon processing the update in the headless environment, the host environment stores the headless environment's file system (containing the files and directories of the second guest environment, including the updated files) as an updated template different from the non-updated template of the first guest environment, step 303.

In other non-limiting embodiments, a plurality of headless environments may be particularly applicable for a plurality of file update requests. Each file update may be processed in isolated headless environments, and managed by the file system of the host environment. The provision of a headless environment by the host environment, in one embodiment, may occur at the same time every day if file updates are retrieved by guest environments at regular intervals. In other non-limiting embodiments, keystrokes or events in user accessed guest may be monitored and upon certain keystrokes or events, may cause the host environment to provide and launch a headless environment for processing the file update.

When an update process is complete, in one embodiment, the host environment provides two guest environments for providing a user access to such updated files, step 304. The first guest environment facilitates user interaction with the updated files using the updated template without an update process. A second guest environment, isolated from the first environment, is also provided by the host environment in a headless manner such that no direct user interaction is permitted with the second guest environment. The headless environment is not only operative with the updated template but is also operative with an update process so that any update requests in the first guest environment are processed in the headless environment via the host environment. When the application update is complete, the first guest environment and any headless environments associated with the first guest environment may be terminated by the host environment, and upon the next file retrieval, the updated template may be operative, step 305.

Exemplary Embodiment of the System Installation Process

It may be further appreciated that the invention provides a secure system for installing new applications also using headless environments and templates. According to FIG. 4 and in one non-limiting embodiment, new installations requests in a first guest environment may be processed in a second headless guest environment that is operative with a copy of the same files and directories as the first guest environment. Installation files may be received by the invention from a plurality of sources including, in some non-limiting embodiments, peripheral devices or over a network communicatively coupled to the first guest environment, step 401.

The installations files may then be stored in volatile memory in the host environment while the virtual machine platform in the host environment provides a headless environment for processing the installation, step 402. The host environment may either create a bootable hard disk image for the headless environment using a template of the first guest environment, or activate an already-booted guest environment operative with a template of the first guest environment. Additionally, the headless environment is operative with an installer for processing the installation files received by the first guest environment.

In one embodiment, the invention may track or manage the new files installed by recording file and registry version changes in the host file system, step 403. Upon processing the installation in the headless environment, the host environment stores the headless environment's file system (containing the files and directories of the second guest environment, including the updated files) as a post-installation template different from the pre-installation template of the first guest environment, step 404. In other non-limiting embodiments, a plurality of headless environments may be applicable for installations involving special file drivers or background processes, such as for example system tray tools and multi-window applications, which may require the retrieval and/or creation of multiple data templates, step 405.

When installation is complete, in one embodiment, the first guest environment may continue to be operative with a pre-installation data template and shut down or terminate the headless environment where the installation was processed, step 406. In another embodiment, the host environment may shut down or terminate both the first guest environment and the associated headless environment, and then provide the user a new guest environment operative with the post-installation data template along with a headless environment operative with an install process, step 406. Thus, new installations may be isolated from the non-updated file systems.

Exemplary Embodiment of Inventive Hardware Environment

Figure 5:
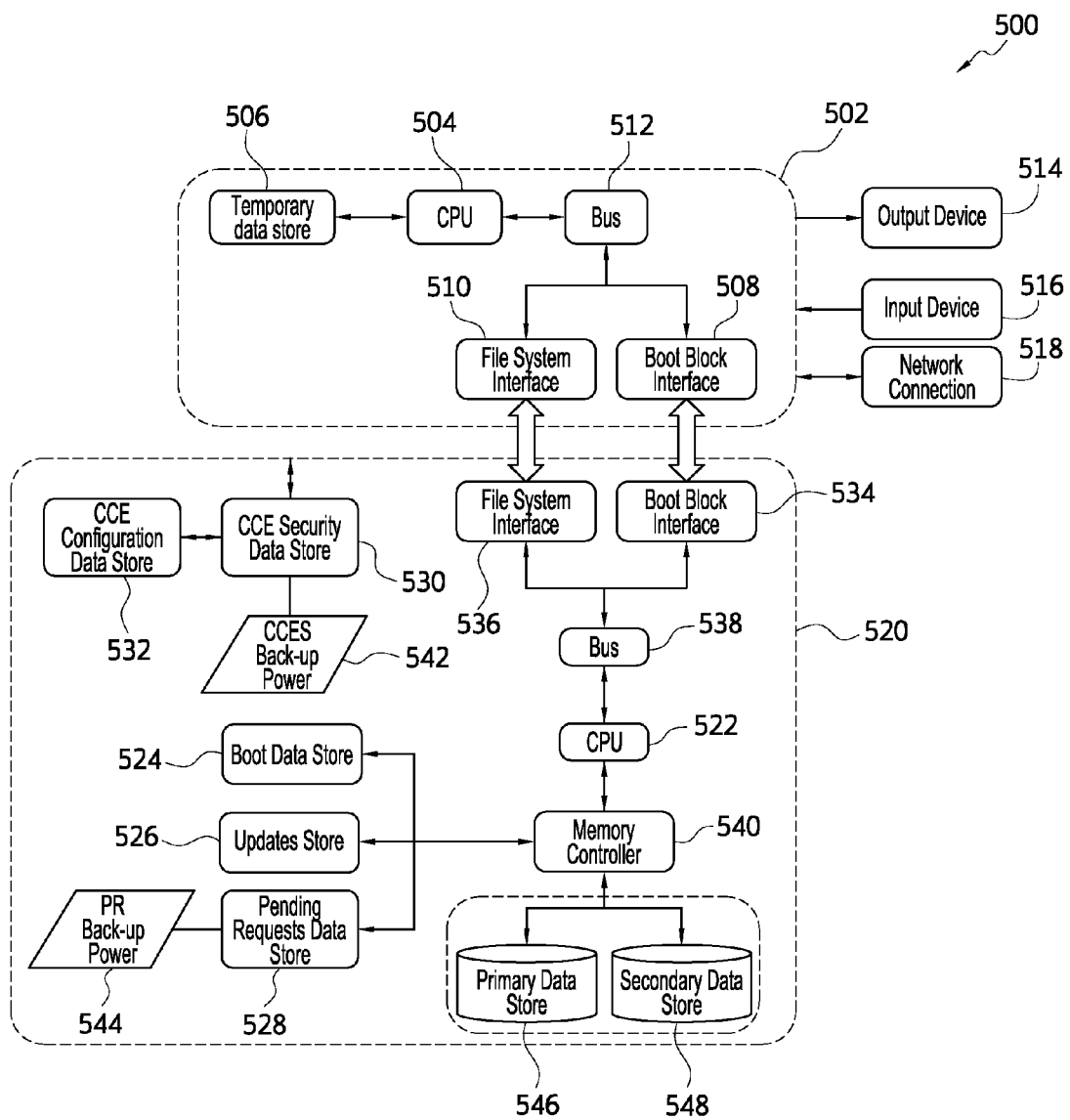
FIG. 5 illustrates an embodiment of the inventive architecture and system.

In one non-limiting embodiment, the above described methods and systems may be operative in a hardware environment such as the system depicted in FIG. 5. Therein illustrates a system 500 incorporating an embodiment of the invention, referred to herein as the Vir2us™ Security Processing System or more generally as the Security Processing System (SPS). The SPS may include a UCE 502, which is the subject matter of the guest environment 102 in FIG. 1, with the following components: a CPU 504 or other processor or processing logic, a volatile memory temporary data store 506, a boot block interface 508, a file system interface 510, a bus 512, an output device 514, an input device 516, and a network interface 518, all well known in the art. The output device 514 may be a monitor of the UCE, for example, and the input device 516 may be a keyboard or mouse, for example. In one non-limiting embodiment, the UCE 502 may be a personal computer. In another non-limiting embodiment, the UCE 502 may be any information appliance including a cellular telephone or voting machine.

The SPS 500 may also include a CCE 520, which is the subject matter of the host environment 101 of FIG. 1, with the following components: a CPU 522, a boot data store 524, an updates data store 526, a pending requests data store 528, a CCE security data store 530, a CCE configuration data store 532, a boot block interface 534, a file system interface 536, a bus 538, and a memory controller 540. The memory controller 540 may communicatively couple the CPU 522 with the boot data store 524, the updates data store 526, and the pending requests data store 528. The CCE 520 may also include back-up power sources, CCE security back-up power 542 and pending requests back-up power 544, coupled to the CCE security data store 530 and pending requests data store 528, respectively. Each CCE security back-up power 542 and pending requests back-up power 544 may supply power to each respectively coupled data store independently of any other power source.

In addition, the CCE 520 may include a primary and secondary data store 546, 548, which may communicatively couple to the CPU 522 through the memory controller 540 and may be the nonvolatile data storages of the SPS 500. These two data stores 546, 548 may couple to the memory controller 540 separately, or optionally, the two data stores 546, 548 may communicatively couple to a bus which may communicatively couple to the memory controller 540.

In one non-limiting embodiment, the CCE 520 may reside in an external box to the UCE 502. In another non-limiting embodiment, the CCE 520 may reside in the same box as the UCE 502.

Figure 6:
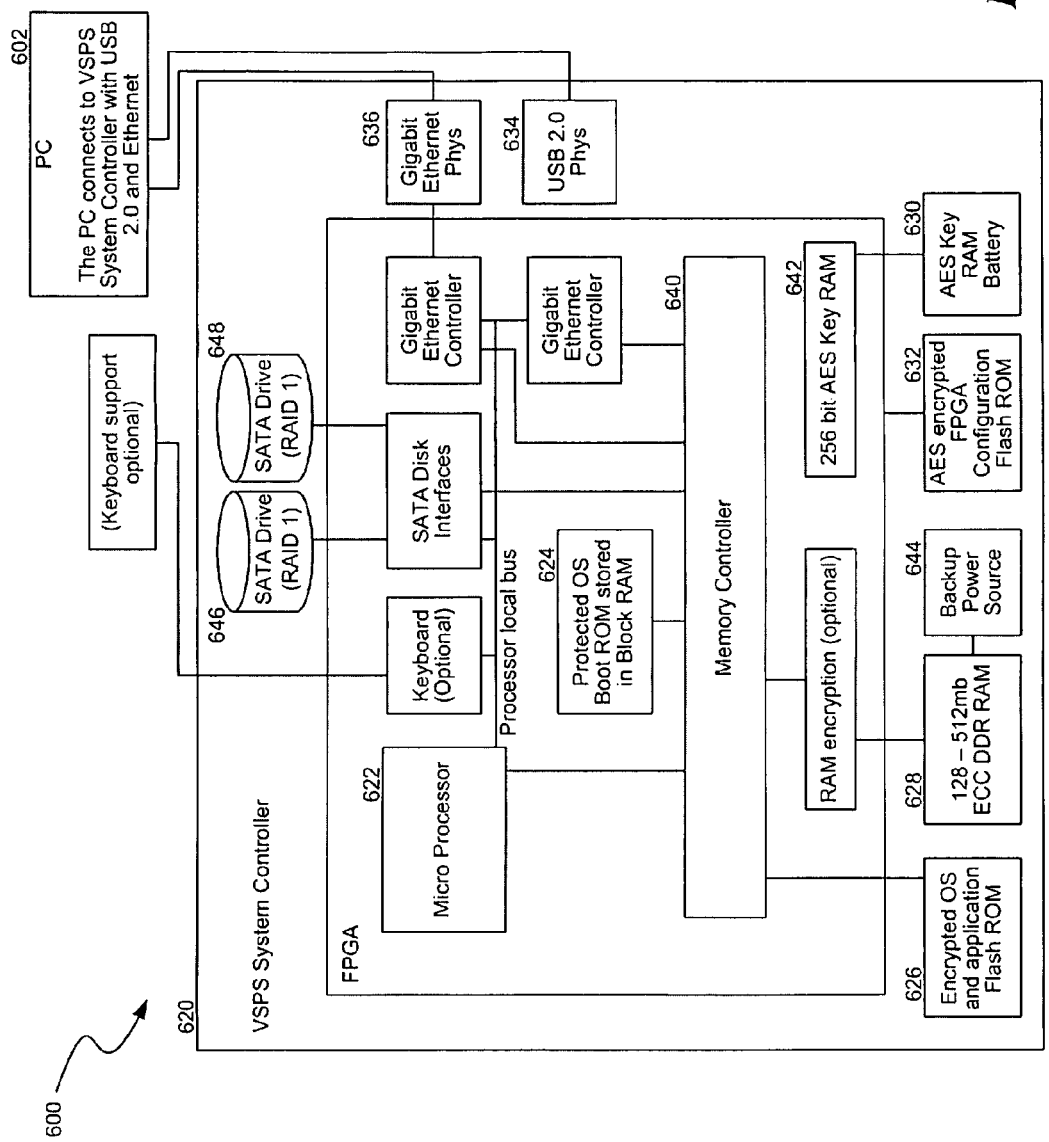
FIG. 6 illustrates an embodiment of the inventive architecture and system including a USB bus and Ethernet interface.

FIG. 6 is a schematic of the components of the CCE 620 according to an embodiment of the invention 600. Within the CCE 620, the micro processor 622 implements the CPU 622. The USB 636 and Ethernet 634 represent the boot block and file system interfaces 534, 536, respectively, which allow the UCE 502 as implemented by a personal computer (PC) 602 to communicate file requests intended for the nonvolatile data stores of the SPS and allow the CCE 620 to respond to such file requests. The Protected OS Boot ROM 624 implements the boot data store 524, which stores the boot partition files and the required operating system (OS) and/or application (App) files to boot up the CCE 620. As used herein, installation files may include program files, help files and any other files required to install an OS or App. The boot data store 524 may be read-only memory to protect against any unintended or unknown attempts to modify the CCE's boot sector files.

In FIG. 6, the OS and App (OS+App) Flash ROM 626 implements the updates data store 526. Modifications to the existing OS and or App(s) of the CCE, or new App installations intended for the CCE stored in the read-only Protect OS Boot ROM 624, are stored in the OS+App Flash ROM 626. Exemplary applications of the CCE may include file system management utilities such as file version control programs, and programs which facilitate secure communication to external processing systems where proprietary and conventional security techniques such as encryption, digital certificates, user authentication, and the like, may be used. The read-only access of the OS+App Flash ROM 626 may provide additional security against malicious code attempting to write to such update and new program installation files. In the preferred embodiment, the OS+App Flash ROM 626 also stores such updates in encrypted form as further discussed herein.

In one non-limiting embodiment, the boot process of the CCE 620 may occur as follows: When the CCE 620 is powered up, the boot files of the CCE 620 are retrieved from the Protected OS Boot ROM 624 through the memory controller 640. During the CCE's boot cycle, the micro processor 622 accesses the OS+App Flash ROM 626 to retrieve any updates (e.g. modifications to existing file content or creation of new files) to the CCE's OS and/or Apps. Upon the upload and installation of all updates from the OS+App Flash ROM 626, the CCE's boot cycle is complete.

SATA Drive 1 646 and SATA Drive 2 648 in FIG. 6 implement the SPS's primary and secondary data stores 546, 548, respectively, collectively referred to herein as the protected data store. SATA Drive 1 646 and SATA Drive 2 648 may be large-capacity, nonvolatile memory such as a hard disk, for example. In the preferred embodiment, SATA Drive 2 648 contains an exact copy of data located in SATA Drive 1 646. The protected data store may implement this redundancy of data storage such that any writes to SATA Drive 1 646 are also written to SATA Drive 2 648. In the event a failure occurs with the either SATA Drive 1 646 or SATA Drive 2 648, the other functioning storage device may support the control computing environment 620. The relationship between these two data stores is known in the art as a redundant array of independent disks (RAID) 1, with a mirrored configuration for example, since one data store is a copy, or "mirrors," the other data store. In this manner, the mirrored storage configuration not only provides additional reliability against data loss in the event one data storage device fails, but may also optimize the processing of read requests when one data storage device is busy processing another read request. Other embodiments of the invention are not so limited to two data stores but may involve any other physical or logical data store configuration to facilitate this redundancy of data storage. Additionally, while the preferred embodiment of the system executes writes to the two data storage devices simultaneously, other non-limiting embodiments may execute file writes to each data storage device in succession.

As further discussed herein, communication between the PC 602 and the CCE 620 are limited primarily to requests involving local disk booting and disk file requests through the boot block and file system interfaces 636, 634. When the PC 602 requests access to write file content or read a file stored in the protected data store (SATA Drive 1 646 and SATA Drive 2 648), whether such files are installation files stored in the boot sector or other user files, the CCE 620 may receive all such requests first and may manage all such queued read and write requests intended for the protected data store. The ECC DDR RAM 628 therefore may act as a repository for all queued requests which implements the pending requests data store 528. In the event that a SPS malfunction occurs with the CCE 620 prior to completing the write requests to the protected data store, the CCE 620 may store all pending requests in the ECC DDR RAM 628 until such time that the CCE 620 is able to function properly again and complete such write tasks.

In the preferred embodiment, the ECC DDR RAM 628 may be connected to a Backup Power Source 644, implementing the pending requests back-up power 544, to provide additional reliability in the event a power failure occurs with the CCE 620. A power failure may include, but is not limited to, a complete power failure or another situation of unregulated power voltage. For example, if the CCE 620 were to shut down due to a complete loss of power, all pending write requests by the PC 602 intended for the protected data store may be preserved until such time that the CCE 620 is able to regain power and complete such request through the power supply provided by the Backup Power Source 644.

The Configuration Flash ROM 632 implements the CCE configuration data store 532 which contains the configuration of the CCE's components in read-only memory. Communicatively coupled to the Configuration Flash ROM 632 is the AES Key RAM 642 which implements the CCE security data store 530 and is a writeable nonvolatile memory. The CCE security data store 530 embodied in the AES Key RAM 642 facilitates the CCE's 620 configuration encryption feature such that access to the CCE configuration data store 632 is exclusively through the CCE security data store 530, as further discussed herein. The AES Key RAM 642 may also couple to a AES Key RAM Battery 630, which implements the CCE security back-up power 542 and is independent of any other system of component power source, to ensure the encrypted state of data in the Configuration Flash ROM 632 in the event of a power failure to the main CCE 220.

In some non-limiting embodiments, referring back to FIG. 5, each boot data store 524, updates data store 526, and pending requests data store 528 may be implemented by individual data storage devices connected to the memory controller. Optionally, the boot data store 524, updates data store 526, and pending requests data store 528 may reside in a single data storage device where each data store is separated by logical address spaces within the device. Similarly the CCE configuration data store 532 and CCE security data store 530 may be implemented by separate physical data storage devices, or optionally, by separate logical addresses on the same data storage device, to encrypt data residing in the CCE configuration data store 532.

Exemplary Embodiment of a SPS Boot Process

Figure 7:
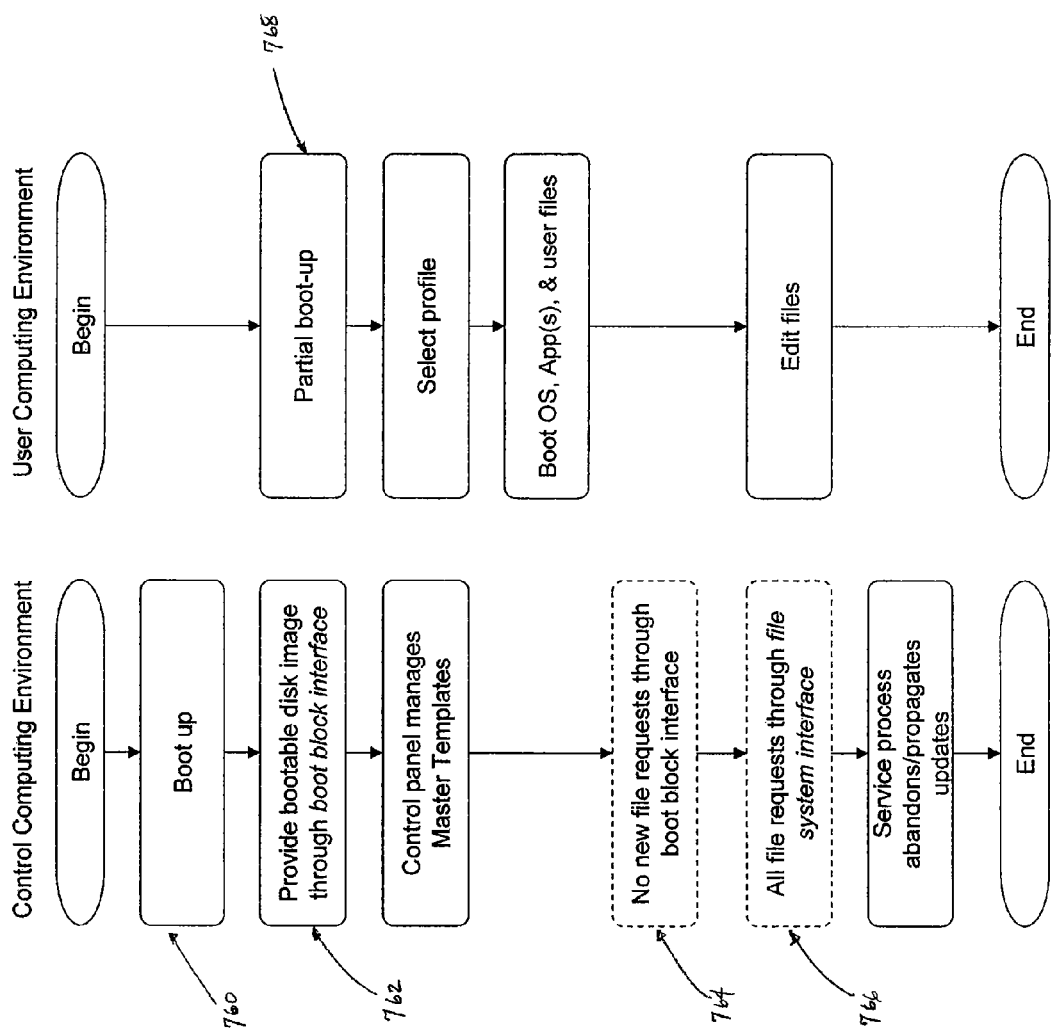
FIG. 7 illustrates the interface between the user computer environment and the control computing environment in the inventive architecture and system.

Communication between the UCE and the CCE are limited primarily to requests involving local disk booting and disk file requests. FIG. 7 illustrates the communication between the CCE 520 and the UCE 502 according to one embodiment of the invention. To begin, a user first powers up the CCE 520, allowing the CCE 520 to complete its boot cycle before powering up the UCE 502, step 760. Next, the user powers up the UCE 502 which initiates the boot cycle of the UCE 502, step 768. To access the bootable files, the UCE 502 may send a request to the CCE 520 to retrieve the bootable disk image through the boot block interfaces 508, 534 of the UCE 502 and CCE 502, respectively. Upon receiving this request, the CCE 520 may retrieve a bootable disk image from the protected data store, where the disk image may be located within an emulated block device residing in the protected data store, step 762. An emulated block device is a software replication of a hardware block device that exists in the form of a single file, referred to herein as a file-backed data store. The file-backed data store may contain the same structures as a physical block device necessary to boot a computer including a boot partition and a file system structure, which enables another computer to read data from the file-backed data store as if the logical file-backed data store were a physical boot block device.

Returning to the inventive system, the disk image supplied by the CCE 520 to the UCE 502 includes a boot partition consisting of a master boot record, a boot loader from which the OS of the UCE 502 loads from, and the file system of UCE 502 which contains all the files needed to boot the UCE 502, and the write access protection of the disk image. Also contained in the file system of the UCE 502 is a copy of the OS installation files, a copy of the user's App installation files, and/or copies of integrated OS and App (OS+App) installation files or the UCE 502, where each OS, App, and OS+App set of installation files may form a master template. The bootable disk image and the related files are then communicated to the UCE 502 back through the boot block interface 508, 534, step 764.

As the UCE 502 boots the OS, the OS drivers are loaded and initialized. Once all the drivers are loaded and initialized, the CCE 520 limits additional file system requests intended for the protected data store from the UCE 502 through the block device interface 534, 508. Although, files may stay open in response to earlier file requests, no new file open requests will be permitted through the block device interface 534, 508.

Exemplary File I/O Requests

During the loading and initialization of OS drivers, the UCE 502 may establish a second and separate communication pathway with the CCE 520 through the SPS's file system interface 510, 536, which is the subject matter of the local storage transport 104 of FIG. 1 and update processing, steps 206 and 302, of FIG. 2 and FIG. 3, respectively. In one non-limiting embodiment where the CCE 520 resides in the same box as the UCE 502, the protected data store may be communicatively coupled to the CCE 520 through a single interface incorporating the functionality of both the boot block interface and the file system interface, using a PCI or SATA interface for example. From this point, all UCE file system requests intended for the boot partition are first communicated through the file system interface 510, 536, to the CCE 520, step 766.

When a file request is received by the CCE 520, the CCE 520 manages such requests in view of the CCE 520's file access and revision control features contained therein. Direct file requests by the UCE 502 may only be executed in the boot partition located in the volatile temporary data store 506 but not the boot-partition of the nonvolatile protected data store. Where malicious code can directly access and/or modify files in the nonvolatile memory's (e.g. hard disk) boot partition with the conventional computing architecture, the inventive system advantageously prevents direct access to files and furthermore successfully defends against the installation or execution of malicious code below the operating system level defenses through the CCE 520's governance. In short, the CCE 520 acts as a file system administrator for all file system requests by the UCE 502.

Figure 8:
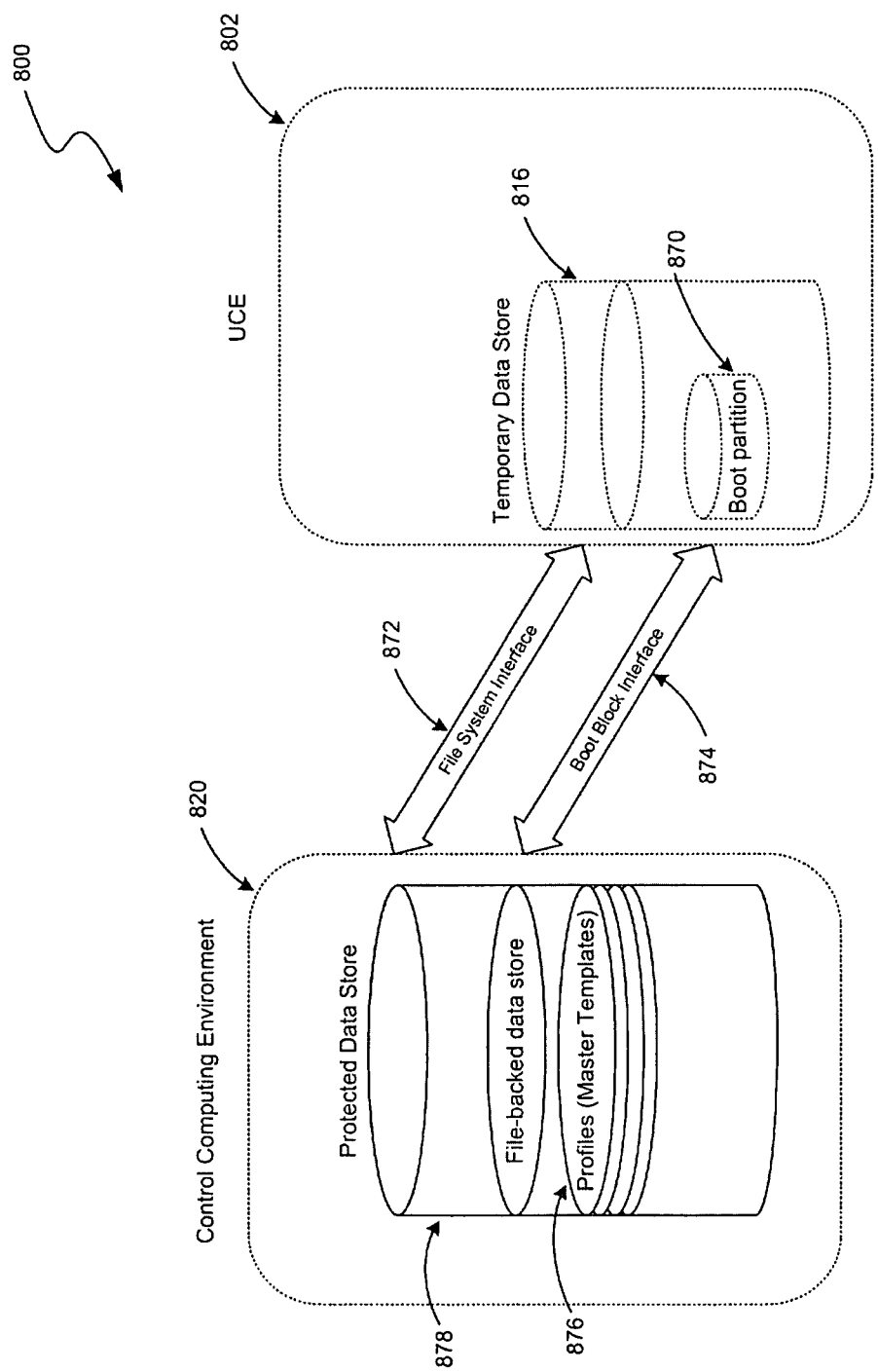
FIG. 8 illustrates the data store mapping between the user computing environment and the control computing environment according to one embodiment of the invention.

Administration and/or management of the UCE 502's file content and file access by the CCE 520 may involve, but are not limited to, read/write access control to metadata and read/write access control to select files based on directory permissions. FIG. 8 illustrates the data mapping 800 between a UCE 802 and the CCE 820 to implement such administration in one embodiment. Since all file requests to the unmodified or non-updated Master Template installation files 876 are processed by the CCE 820, the CCE 820 may prevent direct access by the UCE 802 to such files which is especially advantageous where malicious code attempts to penetrate the SPS without intention or knowledge by the user. More specifically, while malicious code residing in the UCE 802 may update the copy of OS and App installation files in the boot partition 870 of the temporary data store 816 of the UCE 802, the unmodified or non-updated Master Template installation files 876 in the protected data store 878 of the CCE 820 remain unaffected without additional and specific authorization by the CCE 820 to make such updates to the unmodified or non-updated Master Template files 876. While the boot partition files 870 are retrieved by the CCE 820 through the boot block interface 874 to the UCE 802 during the booting of the UCE 802, subsequent file updates to the nonvolatile protected data store 878 may only be accomplished through the file system interface 872 and processed by the CCE 820. In other non-limiting embodiments, the boot partition files 870 in the temporary data store 816 may be read-only access or otherwise contain specific file and/or directory access controls such that all file requests may be accepted or rejected before any file write is actually performed on such boot partition files 870.

Exemplary Control Panel

The SPS may provide a boot time configuration control panel to manage the SPS resources and file system updates. Since the UCE's OS installation files may contain malicious or other undesirable code, the sequence of loading the control panel prior to loading any UCE installation files may ensure that any potential malicious code contained the OS installation files do not affect the control panel, thereby maintaining a trusted and sterilized state of the control panel. In particular, the control panel may provide an interface to allow a user to create, delete, select, and update a profile which is comprised of one or more installation file sets (Master Templates).

A Master Template may include a collection of installation files comprising an OS, an App, or an integrated OS+App, preserving a certain state of such files prior to a particular modification or update. Master templates may utilize the Copy-on-Write (sometimes abbreviated to as "COW") optimization strategy to reduce storage overhead and facilitate reversion of unwanted changes as further discussed herein. COW is an optimization strategy whereby a user is allowed to maintain an unmodified or original copy of a shared system resource, e.g. a file section or complete file, by only allocating blocks on disk (or other storage device or media) or memory when the user makes changes. This may advantageously be applied to a master copy of an operating system, portions of an operating system, application program or programs alone or in combination with an operating system or portion thereof. In one particular non-limiting embodiment, the shared system resource may be a known "clean and pristine" copy of an OS, where clean may mean that the copy of the OS is known to be trusted and virus, spyware, hackerware, and otherwise free of malicious code, for example from a shrink-wrapped box or an authenticated download. It may also mean that customizations that may be incompatible with one or more application programs or with an incompatible combination of application programs are not present. The use of a copy-on-write strategy and use of private copies of a shared system resource may advantageously limit the overhead of private copies to the extent of the user's modifications, when the private copies include only modifications. In other embodiments, a complete private copy may be provided at the expense of additional overhead and additional storage.

In one non-limiting embodiment the base instance, an OS Master Template for example, cannot be safely modified once private copies have been made. Thus, a new derivative instance Master Template comprising an integrated OS+App set of installation files may be created and include only those files which are modified from the base instance OS Master Template. Where updates to an integrated OS+App set of installation files are desired, using the COW strategy a Master Template incorporating such updates may include only the set of files that are modified from the original base OS+App Master Template. These single and/or multi-layer Master Template modifications are referred to herein as "delta revisions", or small modifications, of the original base instance Master Template(s), whether the original Master Template is an OS, App, or integrated OS+App file set.

By using the control panel, a user may manage profiles which may involve the creation, deletion, update or selection of one or more Master Templates. A profile may identify the set of installation files of an OS, or an integrated OS+App(s), specific to a particular user or purpose in one embodiment. This feature may provide added security for private user files or other data requiring various levels of security. For example, where QuickBooks® application files may contain private data such as bank account names and account numbers, the CCE may secure these files such that no other users may retrieve and access these files. When the UCE first boots up, the CCE may require a QuickBooks user to select his QuickBooks profile and provide a password. Upon providing such information, the CCE may then retrieve and load the QuickBooks profile specific files, including the Master Template(s) containing the OS installation files, the QuickBooks application installation files, any other application installation files the user may have associated with his profile, and the specific file directories and read/write file access unique to the user. Based on such file system controls, only the private QuickBooks profile may access the QuickBooks files that belong specifically to that user.

When a second user accesses the SPS and loads his individual profile, for example a "child" profile, the second user may only access files that are associated with the child profile. The profile-specific QuickBooks files of the first user is isolated from the child profile and may not be accessed by the child profile based on the file directory and restricted read/write file access stored in a personality database managed by the CCE. In some non-limiting embodiments, this method of profile-specific file separation and isolation may provide multiple levels of isolation and protection from malicious code. For example, the QuickBooks profile may not include a network interface card driver whereas the child profile may contain such a driver so as to further isolate data associated with the QuickBooks profile from a network and potential access by malicious code.

In this regard, the control panel may allow a user to create new profiles, requiring additional Master Templates containing updates to the base instance Master Templates. The control panel may also allow a user to delete profiles which involve deleting a Master Template(s), select profiles involving the selection of a Master Template(s), and update profiles requiring the creation of a new Master Template(s) containing modifications from the base instance Master Template(s), and the creation of new profiles involving the copying of Master Template(s). By allowing the user to organize such Master Template(s) through this profile management process, the control panel may also act as a disk management utility by reducing overhead where Master Templates share system installation files between and among one or more other Master Templates.

Management of the file system updates intended for the boot sector or abandonment of undesired updates may also be accomplished through the control panel by allowing a user to load up a profile in either a "safe" or "install" mode. In the "safe" mode, any updates to the boot sector installation files or the user's files may be stored only on the temporary data store only. When a user logs off his profile or shuts the SPS down, only the updates to the user's files are propagated (e.g., copied) to the protected data store and boot sector file updates located on the temporary data store are discarded. Upon the next reboot, the CCE may provide the UCE a bootable disk image from the file-backed data store residing in the protected data store which do not contain the recent updates previously stored in the temporary data store. Only the boot partition updates therefore may be discarded or abandoned upon a reboot while updates to the user's files may be persistent. Thus, where malicious code attempts to write to boot sector files, or where a user unintentionally installs updates to the operating system and/or an application, such updates executed in the safe mode are in fact installed only on the nonvolatile temporary data store and may be abandoned on the next reboot.

In the "install" mode, updates made to the boot sector installation files may persist through the next reboot. While updates may still be initially stored only on the temporary data store, the CCE may now propagate (e.g., copy) all updates from the temporary data store, including both the boot sector and user file updates, to the nonvolatile protected data store when a user ends the session and exits that user profile. Upon the next reboot, the file-backed data store which provides the bootable disk image to the UCE retrieved from the protected data store may now load the updated installation files to result in persistent updates.

Exemplary CCE Service Process

The inventive system and method may also provide a service which may monitor, organize, and optimize system resources, referred to herein as the secure CCE service process (SCSP). The SCSP may interface with the user, for example, as an icon on the system tray of the UCE. However, unlike conventional computers, the service in the inventive system may be controlled by the CCE and not the UCE to ensure potential malicious code residing on the UCE may not affect the processing activities of the SCSP. Through the SCSP, the SPS may inform the user of the state of the CCE's components and processes such as, for example, when a physical drive failure occurs or when a read error or other process error occurs. The user or CCE may then be able to respond to such notifications appropriately such as, for example, replacing a physical drive or restarting a process.

The SCSP may also facilitate updates by monitoring and assisting the CCE in managing the deltas (revisions) to the base instance Master Template(s). Where updates to the installation files located on the temporary data store are intended to be persistent, the control panel may prompt the CCE to incorporate such revisions into a new original Master Template installation file. However, where updates are not intended to be persistent, the control panel may prompt the CCE to discard the revisions. The control panel may in a similar fashion monitor the revisions to user files and prompt the CCE to perform the appropriate file maintenance processing. The management of such updates by the control panel also results in the optimization of overhead used by the SPS by ensuring that intended updates are either incorporated into the base instance files or discarded.

Exemplary SPS Data Encryption

In one embodiment, the inventive system may incorporate proprietary technology and methods for data encryption within the CCE. In conventional systems, both the encryption and decryption keys may reside within the same data store or may be accessible from the same processing environment. However, malicious code may infiltrate a file system directory and further access those areas of the file system containing the decryption key, thus compromising the security provided by the traditional data encryption process. The inventive system solves this problem by encrypting data in one data store independently and in isolation of data encryption with another data store. Access to the decryption key of one data store does not reveal the encrypted data contained on another physically or logically isolated data store since each data store is encrypted using a separate encryption key and/or engine.

Figure 9:
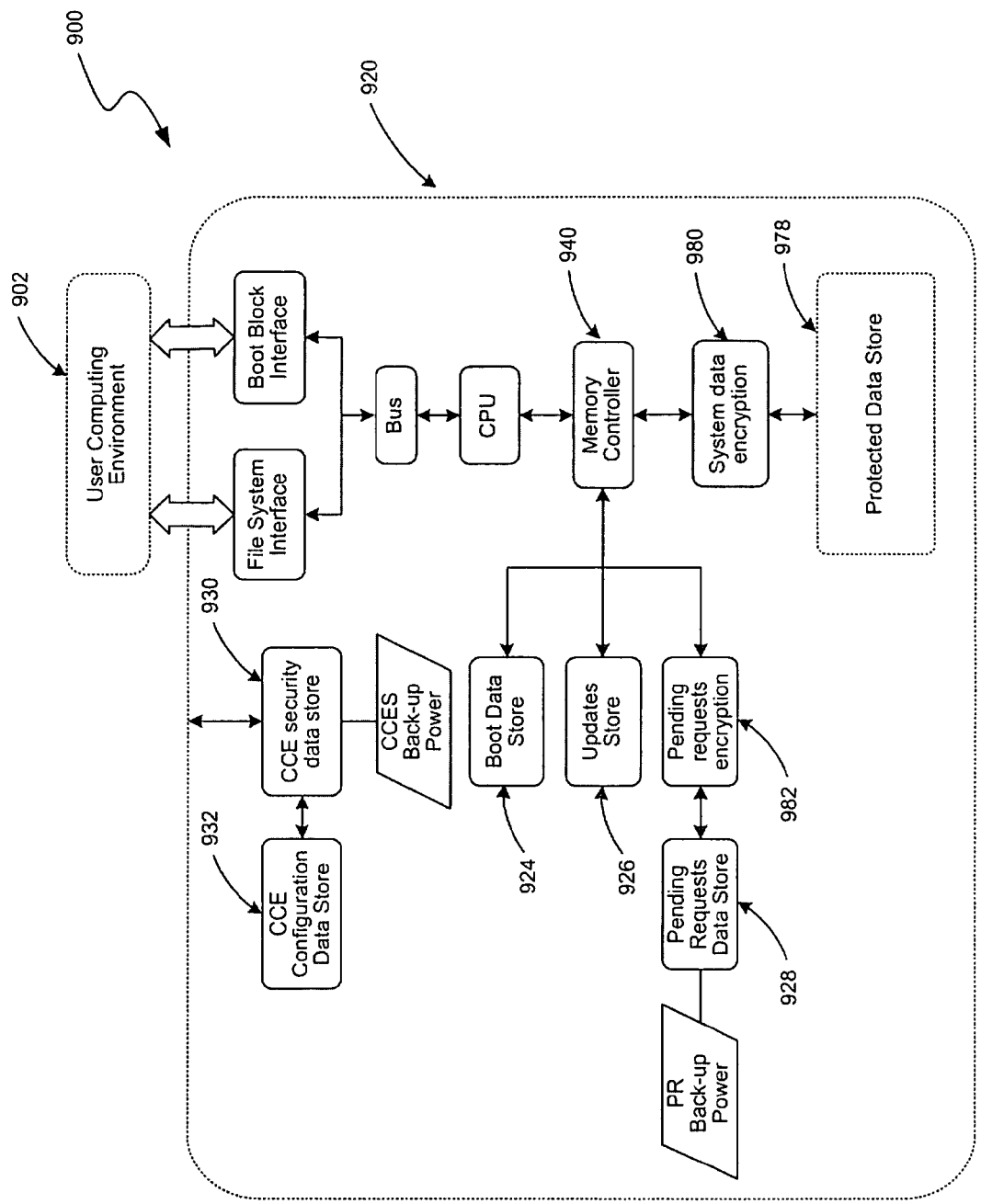
FIG. 9 illustrates the isolated encryption of the inventive architecture and system according to one embodiment of the invention.

FIG. 9 illustrates one embodiment of data encryption by the inventive system 900. In FIG. 9, the CCE 920 may utilize an encryption key stored in the CCE security data store 930 to encrypt data contained in the CCE configuration data store 932. Access to the CCE configuration data store 932 may be exclusively through the CCE security data store 930. The SPS 900 may also utilize another encryption engine, the pending request encryption 982, communicatively coupled to the pending requests data store 928 and the memory controller 940 to encrypt data stored in the pending requests data store 928. In the event the CCE configuration data store 932 is accessed, data in the pending requests data store 928 may remain independently encrypted and access to the CCE configuration data store 932 may not expose data in the pending requests data store 928. Furthermore, since the CCE configuration data store 932 may only be accessed through the CCE security data store 930, data in the CCE configuration data store 932 may be encrypted so even physical access to the CCE configuration data store 932 may not expose the data stored therein.

In the preferred embodiment, the CCE security data store 930 is not communicatively coupled to the memory controller 940 and therefore may not be modified by malicious code or any other unintended user revision requests routed through the memory controller 940. Any modifications to the CCE security data store 930 should be made directly to and specifically for the CCE security data store 930. The CCE security data store 930 may also be reserved by the SPS 900 exclusively for security-related information concerning to the SPS 900 such as an encryption key used for encrypting the configuration of the CCE 920, for example. In other non-limiting embodiments, the CCE security data store 930 may store other identification information of each proprietary system such as, for example, a unique alpha-numeric number. This distinct identifier may allow the SPS 900 to establish and confirm safe communication between a remote computer and the SPS 900 through SSL certificates, for example, as an intended recipient of private data. Accordingly, the SPS 900 may facilitate secure communication of privileged emails, private banking information, or other sensitive communications requiring the highest level of security against interception by malicious code residing in the UCE 902.

Other proprietary encryption methods and techniques involving isolated data encryption may also be applied to other data stores in the CCE 920. In some non-limiting embodiments, the SPS 900 may utilize isolated data encryption with each boot data store 924, updates data store 926, and protected data store 978 (comprised of the primary data store 546 and the secondary data store 548 from FIG. 5) to ensure that access to encrypted data in one data store is isolated and does not compromise the data encryption in another data store. Any data into or out of a data store may be encrypted using its own encryption key or engine that is unique to a key or engine used by another data store. For example, the updates data store 926 may encrypt updates and new program installation files for the CCE 920 where the decryption key resides exclusively in the boot data store 924. Pending writes intended for the protected data store 978 residing in the pending requests data store 928 may also be encrypted in isolation through a pending requests encryption engine 982 residing between the pending requests data store 928 and the memory controller 982. The protected data store 978 may also communicatively couple to its own encryption engine 980 to the memory controller 940 to further protect data contained in the protected data store 978.

In one non-limiting embodiment, encryption keys may be stored in one or more nonvolatile data stores separate from the other data stores in the SPS 900 in the event an encryption engine experiences a data processing or hardware failure. This encryption key data store may reside internally in the CCE 920 in isolation from the SPS 900's other data stores, or as an external data storage device, and may be used to decrypt data in the SPS encrypted data stores such as the protected data store 978, the updates data store 926, or the CCE security data store 930. In another embodiment, the SPS 900 may store an exact copy of data contained in the SPS's one or more encrypted data stores in a non-volatile data store. This backup copy may contain the encrypted or unencrypted form of such data, and may be implemented within the CCE or in an external data storage device.

The principles of this invention transcend any particular operating system, application program, user interface, or device type or characteristic. Essentially the inventive architecture, system, method, computer program, and/or procedures are applicable to all manner of devices and systems that have logic to interpret instructions and/or data and are therefore susceptible to circuit failures and to being altered or corrupted by having different or additional information introduced so that the intended operations are not performed or additional operations are performed. It will be appreciated that some embodiments of this invention will find particular applicability to computing devices, such as cellular telephones, smart phones and/or personal data assistants, or other hand held devices having a voice processing capability. In such devices, the inventive system and method may provide secure voice processing associated with the telephone conversation by encrypting in isolation voice or other data in data segments or during a single use of the cellular telephone. Other embodiments of this invention may find particular applicability to devices such as voting machines, where isolated encryption may be accomplished using a unique identifier encryption key associated with each device user such as a thumb print, a retinal scan, or other biometric identifier, for example.

Exemplary Embodiment for Securing Peripheral Devices

Figure 10:
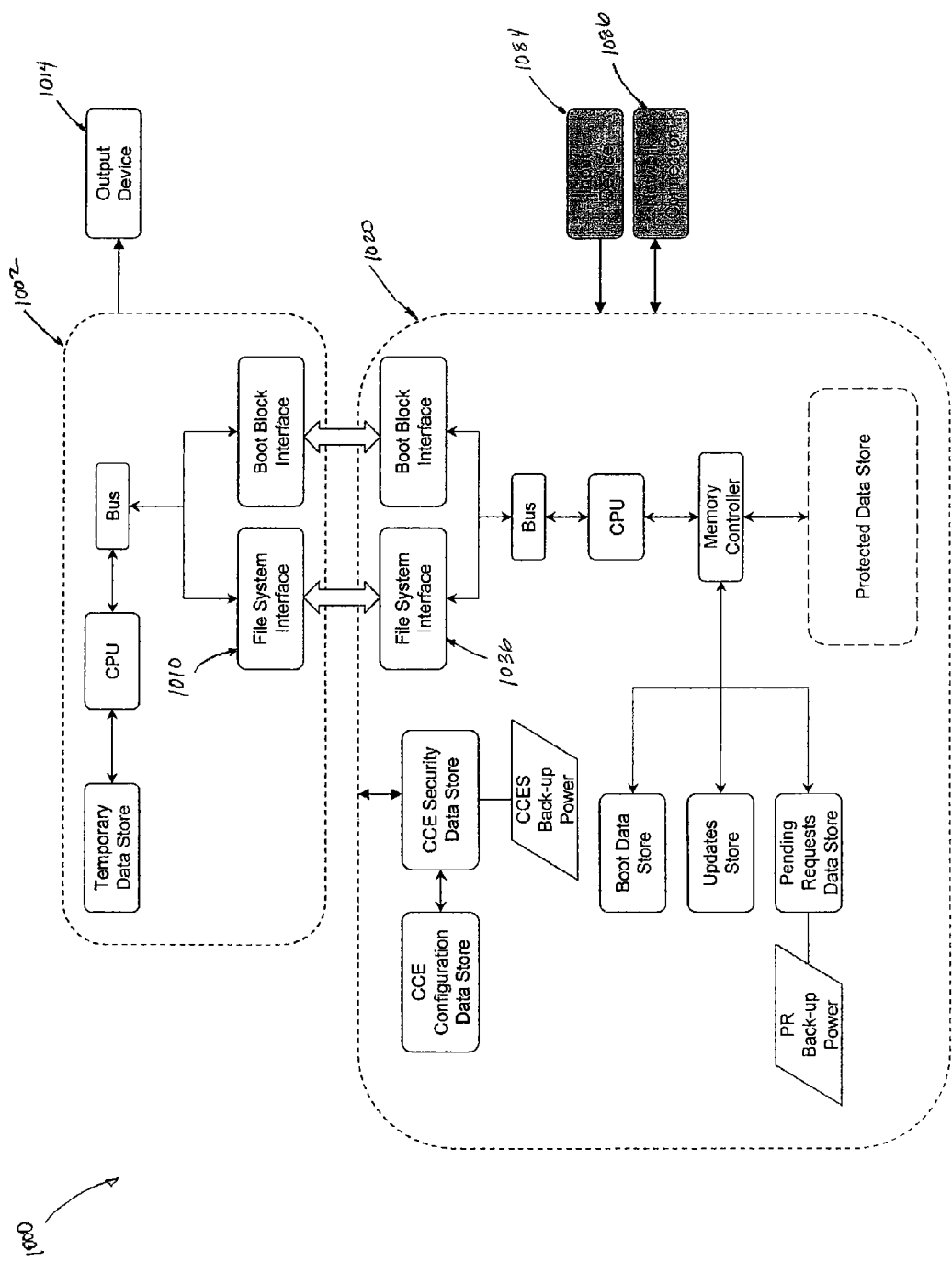
FIG. 10 illustrates an embodiment of the inventive architecture and system where peripheral devices are communicatively coupled to the control computing environment.

Non-limiting embodiments of the invention may allow input/output network connection(s) and peripheral devices to communicatively couple directly with the CCE as illustrated in FIG. 10. In a conventional computer, malicious code may reside on the operating system such that every keystroke is monitored by spyware completely unknown to the user. Such spyware may then transmit such information over a network connection and reveal private information to unintended recipients, thus compromising the security of a conventional system. The inventive architecture and design 1000 solves this problem and may ensure that inputs from peripheral devices are not tracked and retrieved by unintended recipients at the first level through the file request management process of the CCE 1020, which oversees updates to the master copy of the boot sector files of the UCE 1002. For added security, the CCE 1020 may optionally manage inputs from one or more peripheral devices 1084, such as a keyboard or mouse, communicatively coupled to the CCE 1020 and transmit such information in a secure manner over a network connection 1086 also communicatively coupled to the CCE 1020.

For example if a user types a password onto a keyboard attached to the CCE 1020, the keystrokes may be directly and safely transmitted through the network connection 1086 attached to the CCE 1020 to the intended recipient, protected from the exposure to potential malicious code residing on the UCE 1002. In one non-limiting embodiment, the CCE 1020 may communicate through the file system interface 1036, 1010 the monitored activity of an input from a peripheral device 1084 connected to the CCE 1020 for the purposes of displaying such activity on the output device 1014 of the UCE 1002 without providing the UCE 1002 the actual data associated with the input.

The various security features of the inventive system discussed herein may be particularly advantageous with applications which rely on system security measures and reliable system identifiers to control access and usage of data. For example, programs relating to digital rights management require the ability to impose restrictions with a specific instance of a digital work, device, or system. Through coordination of file access management by the control panel and the isolated encryption features of the system architecture, the SPS may provide an environment which is capable of limiting access to files, providing unique device and/or system identifiers, and defending against intrusion by malicious code and hackers.

Exemplary SPS Data Loss Prevention

Figure 11:
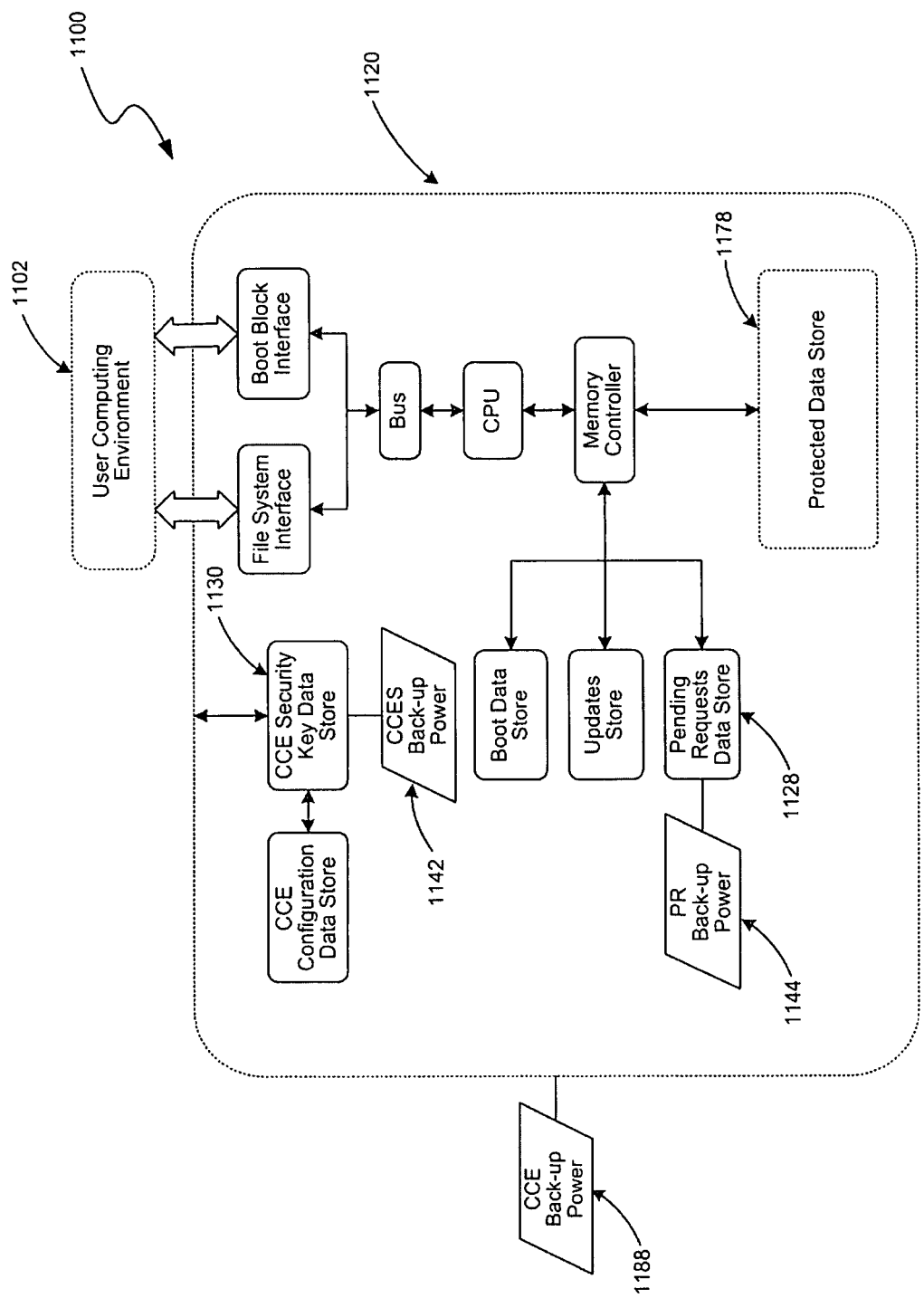
FIG. 11 illustrates the data loss prevention features of the inventive architecture and system according to one embodiment of the invention.

The inventive system may provide added reliability against data loss resulting from power failures, surges and/or brown-outs by incorporating one or more devices to regulate the power supply to the CCE and/or CCE data store components. FIG. 11 illustrates one embodiment of how the inventive system 1100 may protect against data loss associated with such power supply problems. In the preferred embodiment, the CCE security data store 1130 may contain its own power supply implemented by the CCE security back-up power 1142. This power supply may be independent from all other power supplies in the SPS 1100 and may continue to function properly despite power interruptions to SPS 1100. For example, if a power irregularity occurs to the CCE 1120, the CCE security data store 1130 may continue to provide and store the encryption key and/or other proprietary system identifying information notwithstanding the power irregularity to the rest of the system using battery power from the independent CCE security back-up power 1142.

In one non-limiting embodiment, a CCE back-up power 1188 may regulate power to the CCE 1120 and may be implemented through an uninterruptible power supply (UPS), known in the art, operating between the CCE and its power source. In an example where the UCE 1102 supplies power to the CCE 1120, when the UCE 1102 experiences a power failure the CCE back-up power 1188 may sense such failure and take over the primary responsibility of supplying power to the CCE 1120 for a period of time. Upon becoming the primary power supplier, the CCE back-up power 1188 may prompt the CCE 1120 to complete all pending writes and then shut down safely.

In other non-limiting embodiments where a power rail, known in the art, is used to supply power to some or all of the components of the CCE 1120, the SPS 1100 may monitor the voltage levels going through the rail. When the SPS 1100 notices a voltage drop in the power rail, the CCE 1120 may stop all pending writes to the protected data store 1178. All remaining pending writes may then be stored in the pending requests data store 1128, using power supplied by the pending request back-up power 1144, to store such data until the CCE 1120 is able to regain power. When the CCE 1120 is powered up again, the CCE 1120 may retrieve the pending writes from the pending requests data store 1128 and complete those writes to the protected data store 1178.

In another non-limiting embodiment, an additional physical nonvolatile data store, referring to herein as a back-up data store, may communicatively couple with the pending requests data store 1128 to protect against data loss when a power or other hardware failure occurs with the volatile data stores of the CCE 1120. The back-up data store may be implemented by a flash or reprogrammable read-only memory and contain a copy of data stored on the pending requests data store 1128. In the event that the CCE 1120 may no longer write to the pending requests data store 1128, the CCE 1120 may copy the contents of the pending requests data store 1128 onto the back-up data store which may retain such data even after the SPS 1100 powers off. This method of data loss prevention is particularly advantageous where the SPS 1100 remains in an off mode and the pending requests data store 1128 may have exhausted its independent power source from the pending requests back-up power 1144, resulting in the loss of data therein.

Each of the above mentioned proprietary data loss prevention methods may be used individually or in coordination with the other data loss prevention methods discussed herein.

Figure 12:
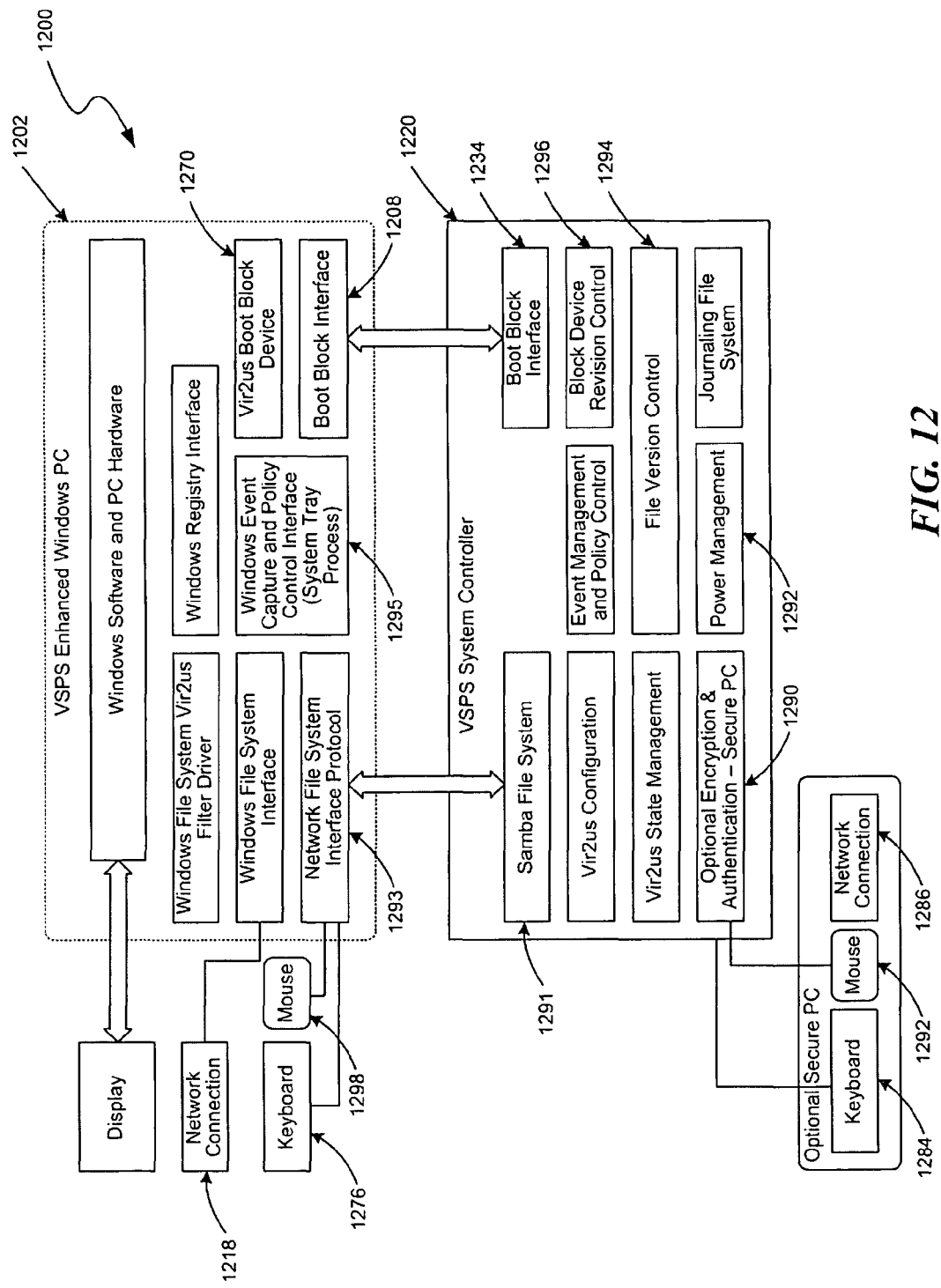
FIG. 12 is an illustration of one embodiment of the software stack and hardware configuration of the inventive system.

FIG. 12 is an illustration of one non-limiting embodiment of the software stack and hardware configuration of the inventive system 1200. As discussed herein, peripheral devices such as a keyboard 1216 or mouse 1298, and/or network connection 1218 may be selectively communicatively coupled to the UCE, implemented by the SPS Enhanced Windows PC (SEWP) 1202. Optionally, a keyboard 1284 or mouse 1292, and/or network connection 1286 may be selectively communicatively coupled to the CCE, implemented by the SPS System Controller (SSC) 1220, for added security. The Windows Event Management and Policy Control Interface 1295 may implement the system tray process administered by the SSC 1220. The Inventive Boot Block Device also referred to as the Vir2us™ Inventive Boot Block Device (VBBD) 1270 may supply the SEWP 1202 the required files for booting the SSC 1220, which may be stored in the file-backed data store provided by the SSC 1220 to the SEWP 1202 through the boot block interfaces 1208, 1234 of the SEWP 1202 and the SSC 1220, respectively. The Block Device Revision Control stack 1296 may also manage requests by the SEWP 1202 to update boot sector files in the VBBD 1270 through the Block Device Revision Control stack 1296 of the SSC 1220.

All file requests following the boot process of the SEWP 1202 intended for the protected data store may be communicated through the network file system interface protocol stack 1293, implementing the file system interface, to the Samba File System 1291 residing in SSC 1220. Samba is an implementation of Windows® network services and protocols which enables a host system using Samba to provide file and print services for networked Windows systems. The host system may set up network shares for select file directories which appear to Windows systems as conventional Windows folders accessible via the network. These shares may then be managed as part of the host system's normal file structure, optionally with each directory having different access privileges overlayed on top of the host system's file protections. For example, home directories may have read/write access for all known users, allowing each to access their own files; however, users may not have access to the files of others unless that permission exists with the host system's normal access privilege.

In the SSC 1220, all persistent file changes in the temporary data store of the SEWP 1202 may be achieved through the File Version Control stack 1294. Enhanced security of the SSC 1220 may exist in the SPS 1200 through the Optional Encryption and Authentication stack 1290. Additionally, the power management 1292 features within the SSC 1220 may provide reliability against data loss in the event a failure occurs with the primary SSC 1220 power supply as implemented by the CCE security back-up power 1142, PR back-up power 1144, and the CCE back-up power 1188 from FIG. 11.

Having described several embodiments of the invention including numerous optional features, it will be clear that the different aspects and features of the invention may be combined and used together as well as used separately and the some features and aspects are optional and need not be included. In this section attention is directed to particular exemplary embodiments that have certain combinations of features. This description is exemplary only and not intended to limit the scope or spirit of the invention in any way. Numerous aspects and features of the invention as described elsewhere in the specification are not described in the paragraphs to follow.

In one aspect, the invention provides a method for a computer or information appliance to securely manage file updates, the method comprising the computer-executed steps of: a first processing environment retrieving a bootable disk image for a second processing environment from one of a plurality of data storages in the first processing environment; the first processing environment sending such bootable disk image to the second processing environment through a first interface between the first and second processing environments; the second processing environment storing the bootable disk image in a temporary data store in the second processing environment; then following the completion of the booting of the second processing environment, the first processing environment limiting file requests by the second processing environment to the plurality of data storages through the first interface to only those requests required to complete booting; and then the first processing environment managing non-booting requests by the second processing environment to the plurality of data storages through a second interface between the first and second processing environments.

In another aspect of the method above, the method for a computer or information appliance to securely manage file updates above further comprising the computer-executed step of selecting the second processing environment from a plurality of processing environments different from the first processing environment.

In another aspect of the method above for a computer or information appliance to securely manage file updates, the method for a computer or information appliance to securely manage file updates above further comprising the computer-executed step of: the first processing environment monitoring events in the second processing environment; upon the occurrence of one or a plurality of events, the first processing environment receiving data from the second processing environment through the second interface; and performing data processing in the first processing environment using data received from the second processing environment.

In another aspect, the invention provides a computer or information appliance adapted for securely managing file updates, the computer or information appliance comprising: means for retrieving, in a first processing environment, a bootable image for a second processing environment from one of a plurality of storage devices; a first interface between the first and second processing environments; a second interface between the first and second processing environments; means, in the first processing environment, for sending the bootable image to the second processing environment through the first interface; means, in the second processing environment, for storing the bootable image in a temporary data store; means, in the first processing environment, for limiting file requests by the second processing environment to the plurality of hard disk drives through the first interface to only those requests required to complete booting following the completion of the booting of the second processing environment; and means, in the first processing environment, for managing non-booting requests by the second processing environment to the plurality of hard disk drives through the second interface.

In one embodiment of the invention, the invention provides a method for a computer or information appliance to securely manage file updates, the method comprising the computer-executed steps of: providing an update data storage in a processing environment for storing a file update, such update data storage being different from a data storage for storing operating system and program application files; the processing environment receiving a file update and storing the file update in the update data storage; and upon verifying the file update with stored data on the update data storage, processing the update file on the data storage storing operating system and program application files.

In another aspect the invention provides a method for a computer or information appliance to provide enhanced processing reliability, the method for a computer or information appliance to provide enhanced processing reliability comprising the computer-executed steps of: providing a processing environment being powered by a first power supply; providing a first data storage in the processing environment powered by the first power supply; providing a second data storage in the processing environment powered by a second power supply; storing data to the first data storage and the second data storage; the second power supply supplying power to the first data storage when a loss in power from the first power supply occurs; and upon the restoration of power to the first power supply, supplying power to the processing environment powered by the first power supply and then copying data stored in the second data storage to the first data storage.

In another embodiment of the invention, the invention provides a computer or information appliance for securely managing file updates, the computer or information appliance comprising: a processing environment communicatively coupled to a network; means for providing an update data storage in the processing environment for storing a file update, such update data storage being different from a data storage for storing operating system and program application files; means for the processing environment receiving a file update and storing the file update in the update data storage; means for verifying the file update with stored data on the update data storage; and means for processing the update file on the data storage storing operating system and program application files.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. For example, although the embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for a computer or information appliance to securely manage file updates, the method comprising computer-executed steps of:
- a first processing environment retrieving a bootable disk image for a second processing environment from one of a plurality of data storages in the first processing environment;
- the first processing environment sending the retrieved bootable disk image to the second processing environment through a first interface between the first and second processing environments;
- the second processing environment storing the bootable disk image in a first temporary data storage in the second processing environment;
- the second processing environment initiating a booting of the second processing environment using the stored bootable disk image;
- following the completion of the booting of the second processing environment, the first processing environment limiting file requests by the second processing environment to the plurality of data storages in the first processing environment through the first interface to only requests required to complete the booting; and
- the first processing environment managing non-booting requests by the second processing environment to the plurality of data storages through a second interface between the first and second processing environments,
- wherein the managing the non-booting request including file system requests from the second processing environment comprises:
  - providing to the second processing environment a file system in the bootable disk image supplied by the first processing environment;
  - storing the file system in a second temporary data storage in the second processing environment;
  - upon receiving a request from the first processing environment to process data in the file system in the second processing environment, processing the request on the second temporary data storage in the second processing environment and providing output of the processed request to the first processing environment through the second interface.

2. The method for the computer or information appliance to securely manage the file updates as in claim 1, further comprising a computer-executed step of creating the second processing environment from within the first processing environment.

3. The method for the computer or information appliance to securely manage the file updates as in claim 1, further comprising a computer-executed step of selecting the second processing environment from a plurality of processing environments different from the first processing environment.

4. The method for the computer or information appliance to securely manage the file updates as in claim 1, wherein the second interface is a filter driver.

5. The method for the computer or information appliance to securely manage the file updates as in claim 1, further comprising computer-executed steps of:
- the first processing environment monitoring events in the second processing environment;
- upon an occurrence of one or a plurality of events, the first processing environment receiving event data from the second processing environment through the second interface;
- the first processing environment providing the bootable disk image of the second processing environment to a third processing environment different from the second processing environment through a third interface between the first and third processing environments;
- the third processing environment booting from the bootable disk and establishing a fourth interface between the first and third processing environment;
- the first processing environment then providing the event data received from the second processing environment to the third processing environment through the fourth interface;
- performing data processing in the third processing environment using the received event data;
- the first processing environment receiving the processed event data from the third processing environment through the fourth interface and storing the processed event data in the first processing environment; and
- performing data processing in the first processing environment using the event data received from the second processing environment.

6. The method for the computer or information appliance to securely manage the file updates as in claim 5, wherein prior to the step of performing data processing in the first processing environment, the method further comprising storing the received event data in a temporary data storage in the first processing environment and validating the received event data with existing data stored in a nonvolatile data storage in the first processing environment.

7. A computer or information appliance adapted for securely managing file updates, the computer or information appliance comprising:
- means for retrieving, in a first processing environment, a bootable image for a second processing environment from one of a plurality of storage devices;
- a first interface between the first and second processing environments;
- a second interface between the first and second processing environments;
- means, in the first processing environment, for sending the bootable image to the second processing environment through the first interface;
- means, in the second processing environment, for storing the bootable image in a first temporary data storage;
- means, in the second processing environment, for initiating a booting of the second processing environment using the stored bootable image;
- means, in the first processing environment, for limiting file requests by the second processing environment to the plurality of storage devices through the first interface to only requests required to complete the booting following the completion of the booting of the second processing environment; and
- means, in the first processing environment, for managing non-booting requests by the second processing environment to the plurality of storage devices through the second interface;
- means for the first processing environment monitoring events in the second processing environment;
- means for the first processing environment receiving event data from the second processing environment through the second interface upon an occurrence of one or a plurality of events;

means for performing data processing in the first processing environment using event data received from the second processing environment;
a third processing environment different from the first and second processing environments;
a third interface between the third processing environment and the first processing environment;
a fourth interface between the third processing environment and the first processing environment;
means for the first processing environment providing the bootable image of the second processing environment to the third processing environment through the third interface;
means for the third processing environment booting from the provided bootable image;
means for the first processing environment providing event data received from the second processing environment via the second interface to the third processing environment via the fourth interface;
means for performing data processing in the third processing environment using the received event data; and
means for the first processing environment receiving the processed event data from the third processing environment through the fourth interface and for storing the processed event data in the first processing environment.

8. The computer or information appliance adapted for securely managing the file updates as in claim 7, wherein the first interface is different from the second interface.

9. The computer or information appliance adapted for securely managing the file updates as in claim 7, wherein at least one of the plurality of storage devices comprises a hard disk drive.

10. The computer or information appliance adapted for securely managing the file updates as in claim 7, wherein the plurality of storage devices comprises a hard disk drive, and the bootable image comprises a disk image.

11. The computer or information appliance adapted for securely managing the file updates as in claim 7, further comprising a means for creating the second processing environment from within the first processing environment.

12. The computer or information appliance adapted for securely managing the file updates as in claim 7, further comprising a means for selecting the second processing environment from a plurality of processing environments different from the first processing environment.

13. The computer or information appliance adapted for securely managing the file updates as in claim 7, wherein the second interface is a filter driver.

14. The computer or information appliance adapted for securely managing the file updates as in claim 7, further comprising:
means for providing the second processing environment a file system in the bootable disk image supplied by the first processing environment;
means for storing the file system in a second temporary data storage in the second processing environment; and
means for processing the non-booting requests from the first processing environment including file request to process the file system on the second temporary data storage in the second processing environment and for providing output of the processed request to the first processing environment through the second interface.

15. A The computer or information appliance adapted for securely managing the file updates as in claim 7, further comprising:
means for storing the event data in a temporary data storage in the first processing environment and means for validating the received event data with existing data stored in a nonvolatile data storage in the first processing environment.

16. The computer or information appliance adapted for securely managing the file updates as in claim 7, further comprising:
a first encryption key and a second encryption key in the first processing environment;
in the first processing environment, a first decryption key and second decryption key for decrypting data encrypted with the first and second encryption keys, respectively;
means for storing the encryption keys in a first storage device selected from the plurality of storage devices;
means for storing the decryption keys in a second storage device selected from the plurality of storage devices;
means for encrypting a first data using the first encryption key and for storing the encrypted first data in a third storage device selected from the plurality of storage devices;
means for encrypting a second data using the second encryption key and for storing the encrypted second data in a fourth storage device selected from the plurality of storage devices;
means for decrypting the first encrypted data using the first decryption key and for decrypting the encrypted second data using the second decryption key.

17. The computer or information appliance adapted for securely managing the file updates as in claim 16, wherein the first storage device is different from the second storage device.

18. The computer or information appliance adapted for securely managing the file updates as in claim 16, wherein the first storage device is located in a different logical memory partition from the second storage device.

19. The computer or information appliance adapted for securely managing the file updates as in claim 7, further comprising:
a plurality of peripheral devices communicatively coupled to the second processing environment;
means for the first processing environment monitoring peripheral device events in the second processing environment; and
means for performing event data processing in the first processing environment upon the monitoring by the first processing environment of a peripheral device activity in the second processing environment, for the first processing environment providing the processed event data to the second processing environment, and for the second processing environment displaying the processed event data on an output peripheral device selected from the plurality of peripheral devices.

20. A method for a computer or information appliance to securely manage file updates comprising computer-executed steps of:
a first processing environment retrieving a bootable disk image for a second processing environment from one of a plurality of data storages in the first processing environment;
the first processing environment sending the retrieved bootable disk image to the second processing environment through a first interface between the first and second processing environments;
the second processing environment storing the bootable disk image in a temporary data store in the second processing environment;

the second processing environment initiating a booting of the second processing environment using the stored bootable disk image;

following the completion of the booting of the second processing environment, the first processing environment limiting file requests by the second processing environment to the plurality of data storages through the first interface to only requests required to complete the booting; and the first processing environment managing non-booting requests by the second processing environment to the plurality of data storages through a second interface between the first and second processing environments;

providing the second processing environment a plurality of peripheral devices;

communicatively coupling the second processing environment to the plurality of peripheral devices;

the first processing environment monitoring peripheral device events in the second processing environment;

upon the monitoring by the first processing environment of a peripheral device an activity in the second processing environment, performing activity data processing in the first processing environment, providing the processed activity data to the second processing environment, displaying the processed activity data on an output peripheral device selected from the plurality of peripheral devices in the second processing environment, receiving unknown data and source identification data for the unknown data in the second processing environment;

providing the source identification data to the first processing environment from the second processing environment and storing source identification data in the first processing environment;

communicatively coupling the first processing environment to a third processing environment using a third interface; and providing the source identification data to the third processing environment through the third interface; and upon verifying the source identification data in the third processing environment, the first processing environment receiving the unknown data from the second processing environment, the first processing environment then providing the received unknown data to the third processing environment through the third interface, and the third processing environment storing and processing the received unknown data in the third processing environment.

* * * * *